United States Patent
Khandekar et al.

(10) Patent No.: US 9,130,698 B2
(45) Date of Patent: Sep. 8, 2015

(54) FAILURE INDICATION FOR ONE OR MORE CARRIERS IN A MULTI-CARRIER COMMUNICATION ENVIRONMENT

(75) Inventors: Aamod Dinkar Khandekar, San Diego, CA (US); Nathan Edward Tenny, Poway, CA (US); Parag Arun Agashe, San Diego, CA (US); Wanshi Chen, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 12/783,077

(22) Filed: May 19, 2010

(65) Prior Publication Data

US 2010/0296389 A1    Nov. 25, 2010

Related U.S. Application Data

(60) Provisional application No. 61/180,381, filed on May 21, 2009.

(51) Int. Cl.
*H04L 5/00* (2006.01)

(52) U.S. Cl.
CPC .............. *H04L 5/0007* (2013.01); *H04L 5/006* (2013.01); *H04L 5/0037* (2013.01); *H04L 5/0085* (2013.01)

(58) Field of Classification Search
USPC ......... 370/216, 230, 231, 235, 242, 328, 332, 370/333, 338; 455/450–455, 512, 513
See application file for complete search history.

(56) References Cited

U.S. PATENT DOCUMENTS

| | | | |
|---|---|---|---|
| 2003/0220119 A1* | 11/2003 | Terry | 455/466 |
| 2006/0154671 A1* | 7/2006 | Kang et al. | 455/450 |

(Continued)

FOREIGN PATENT DOCUMENTS

| | | | |
|---|---|---|---|
| CN | 101223716 A | | 7/2008 |
| KR | WO2007/091858 | * | 8/2007 |

(Continued)

OTHER PUBLICATIONS

CMCC: "Resource Allocation and PDCCH Design Issues in Carrier Aggregation", 3GPP Draft, R1-090924, 3rd Generation Partnership Project (3GPP), Mobile Competence Centre, 650, Route Des Lucioles, F-06921 Sophia-Antipolis Cedex, France, no. Athens, Greece, Feb. 6, 2009, XP050318765. [retrieved on Feb. 6, 2009] Strategy 2.

(Continued)

*Primary Examiner* — Yemane Mesfin
*Assistant Examiner* — Peter Chen
(74) *Attorney, Agent, or Firm* — John J. Ketchum

(57) ABSTRACT

Systems and methodologies are described that facilitate indicating a loss of channel quality on a component carrier of a plurality of component carriers. A UE can monitor configured component carriers to determine channel qualities associated therewith. The UE can transmit carrier quality information that includes the channel qualities of the plurality of component carriers. In addition, the UE can identify a component carrier experiencing a loss of channel quality and notify a base station of the component carrier with poor channel conditions. In one aspect, the UE can incorporate additional information into a scheduling request. In addition, the UE can generate a CQI report that contains the carrier quality information. Further, the base station, when a loss of channel quality occurs, can retry transmission on different carriers. Moreover, the base station can employ information provided by the UE when selecting a component carrier for a transmission.

25 Claims, 15 Drawing Sheets

(56) References Cited

U.S. PATENT DOCUMENTS

| | | | |
|---|---|---|---|
| 2006/0280142 A1 | 12/2006 | Damnjanovic et al. | |
| 2007/0008943 A1* | 1/2007 | Grant et al. | 370/342 |
| 2007/0047498 A1* | 3/2007 | Zhang et al. | 370/335 |
| 2007/0082620 A1* | 4/2007 | Zhang et al. | 455/69 |
| 2009/0316676 A1* | 12/2009 | Kolding et al. | 370/345 |
| 2010/0046442 A1 | 2/2010 | Harada et al. | |
| 2010/0210213 A1* | 8/2010 | Pawar et al. | 455/62 |
| 2010/0232373 A1* | 9/2010 | Nory et al. | 370/329 |
| 2012/0057499 A1* | 3/2012 | Pedersen et al. | 370/252 |

FOREIGN PATENT DOCUMENTS

| | | |
|---|---|---|
| WO | WO2006086359 A2 | 8/2006 |
| WO | 2007148573 A1 | 12/2007 |
| WO | WO-2008093619 A1 | 8/2008 |
| WO | WO-2009022566 A1 | 2/2009 |
| WO | WO-2009034606 A1 | 3/2009 |
| WO | 2009055804 A2 | 4/2009 |
| WO | WO2010087659 A2 | 8/2010 |
| WO | WO-2010126106 A1 | 11/2010 |

OTHER PUBLICATIONS

Ericsson: "Introduction of Dual-Cell HSDPA Operation on Adjacent Carriers", 3GPP Draft, R1-083974 25214CR0497R3 DC-HSDPA, 3rd Generation Partnership Project (3GPP), Mobile Competence Centre 650, Route Des Lucioles, F-06921 Sophia-Antipolis Cedex, France, no. Prague, Czech Republic, Oct. 6, 2008, XP050317277, [retrieved on Oct. 6, 2008].

Huawei: "Discussion on RLF in DC-HSDPA", 3GPP Draft, R2-084402, 3rd Generation Partnership Project (3GPP), Mobile Competence Centre, 650, Route Des Lucioles, F-06921 Sophia-Antipolis Cedex, France, no. Jeju, Aug. 11, 2008, XP050319471, [retrieved on Aug. 11, 2008].

Huawei: "PUCCH design for carrier aggregation" 3GPP Draft; R1-091275, 3rd Generation Partnership Project (3GPP), Mobile Competence Centre ; 650, Route Des Lucioles ; F-06921 Sophia-Antipolis Cedex ; France, no. Seoul, Korea; Mar. 17, 2009, XP050338883 [retrieved on Mar. 17, 2009].

Interdigital: "Dual-Cell HSUPA Considerations", 3GPP Draft, R2-092449, 3rd Generation Partnership Project (3GPP), Mobile Competence Centre, 650, Route Des Lucioles, F-06921 Sophia-Antipolis Cedex, France, no. Seoul, Korea, Mar. 17, 2009, XP050340155, [retrieved on Mar. 17, 2009].

Interdigital: "Radio 11 Hk failure and channel establishment", 3GPP Draft, R2-093203, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050340908, [retrieved on Apr. 28, 2009].

International Search Report and Written Opinion—PCT/US2010/035857, International Search Authority—European Patent Office—Apr. 8, 2011.

Nokia Siemens Networks et al., "Primary Component Carrier Selection, Monitoring and Recovery", 3GPP Draft, R1-091779, 3rd Generation Partnership Project (3GPP), Mobile Competence Centre, 650, Route Des Lucioles, F-06921 Sophia-Antipolis Cedex, France, no. San Francisco, USA, Apr. 28, 2009, XP050339300, [retrieved on Apr. 28, 2009].

Taiwan Search Report—TW099116133—TIPO—Apr. 5, 2013.

LG Electronics: "UL control channel design to support carrier aggregation", 3GPP Draft; R1-091204 LTEA_UL Control Channel Design, 3rd Generation Partnership Project (3GPP). Mobile Competence Centre ; 650, Route Des Lucioles ; F-06921 Sophia-Antipolis Cedex ; France, no. Seoul, Korea; Mar. 17, 2009, XP050338819,[retrieved on Mar. 17, 2009].

* cited by examiner

FAILURE INDICATION FOR ONE OR MORE CARRIERS IN A MULTI-CARRIER COMMUNICATION ENVIRONMENT

CLAIM OF PRIORITY UNDER 35 U.S.C. §119

The present Application for Patent claims priority to U.S. Provisional Application Ser. No. 61/180,381, filed May 21, 2009, entitled "Failure Indication for One or More Carriers in a Multi-Carrier Communication System." The aforementioned U.S. Provisional Application is assigned to the assignee hereof and hereby expressly incorporated by reference in their entirety.

BACKGROUND

I. Field

The following description relates generally to wireless communications systems, and more particularly to indicating and recovering from a failure of a component carrier in wireless communications systems configured with multiple carriers.

II. Background

Wireless communication systems are widely deployed to provide various types of communication content such as voice and data, Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HS-DPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

As wireless communications continue to grow in popularity, consumers demand additional features and greater performance. Such features can require high data rates, which can be difficult to reliably achieve within a limited bandwidth, power constraints, and/or interference constraints of a wireless communication system. One option to increase bandwidth (e.g., widen bandwidth), without a large impact on the complexity of radio equipment (e.g., transmitters and receivers), is to implement carrier aggregation. With carrier aggregation, multiple component carriers can be aggregated or grouped to result in an overall wider system bandwidth. Each component carrier can include a complete downlink and uplink with control and traffic channels. Thus, each component carrier can appear as an individual deployment of a wireless communication technology.

Wireless communication devices (e.g., base stations, mobile terminals, etc.) can be configured to utilize multiple component carriers to send data. For instance, a base station and mobile terminal can be configured to respectively transmit and receive data on downlinks of multiple carriers. In addition, the mobile terminal can be configured to utilize a plurality of uplink frequencies on multiple uplink carriers. Accordingly, higher data rates and greater overall throughput can be achieved without a large impact on equipment complexity.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating indicating a loss of channel quality on a component carrier of a plurality of component carriers. A UE can monitor configured component carriers to determine channel qualities associated therewith. The UE can transmit carrier quality information that includes the channel qualities of the plurality of component carriers. In addition, the UE can identify a component carrier experiencing a loss of channel quality and notify a base station of the component carrier with poor channel conditions. In one aspect, the UE can incorporate additional information into a scheduling request. In addition, the UE can generate a CQI report that contains the carrier quality information. Further, the base station, when a loss of channel quality occurs, can retry transmission on different carriers, thus avoiding a failing carrier. Moreover, the base station can employ information provided by the UE when selecting a component carrier for a transmission.

According to a first aspect, a method is described herein that can include identifying at least one component carrier, from a plurality of component carriers, experiencing a loss of channel quality. The method can further comprise notifying a base station about the loss of channel quality on the at least one component carrier.

Another aspect relates to a wireless communications apparatus. The wireless communications apparatus can include at least one processor configured to identify a component carrier, from a plurality of component carriers, experiencing a loss of channel quality. The at least one processor can further be configured to notify a base station about the loss of channel quality on the component carrier.

Yet another aspect relates to an apparatus that can include means for identifying a component carrier, from a plurality of component carriers, experiencing a loss of channel quality. The apparatus can also include means for notifying a base station about the loss of channel quality on the component carrier.

Still another aspect relates to a computer program product that can comprise a computer-readable medium. The computer-readable medium can include code for causing at least one computer to identify a component carrier, from a plurality of component carriers, experiencing a loss of channel quality. The computer-readable medium can also include code for causing the at least one computer to notify a base station about the loss of channel quality on the component carrier.

In accordance with another aspect, an apparatus is described. The apparatus can include a control channel monitor module that evaluates a plurality of component carriers to determine a carrier quality associated with each component carrier. Further, the apparatus can include a quality information module that generates carrier quality information based the carrier quality associated with each component carrier. In addition, the apparatus can include a physical layer module that incorporates the carrier quality information into a transmission to a base station.

According to other aspects, a method is described that can include receiving a scheduling request from a mobile device and transmitting control information to the mobile device on a first component carrier. Further, the method can include detecting whether the control information is received by the mobile device and retransmitting the control information to the mobile device on a second component carrier when the control information is not received.

Another aspect relates to an apparatus that can include means for receiving a scheduling request from a mobile device. The apparatus can also include means for transmitting control information to the mobile device on a first component carrier. Further, the apparatus can include means for detecting whether the control information is received by the mobile device. In addition, the apparatus can include means for retransmitting the control information to the mobile device on a second component carrier when the control information is not received.

Yet another aspect relates to a computer program product comprising a computer-readable medium. The computer-readable medium can include code for causing at least one computer to receive a scheduling request from a mobile device, code for causing the at least one computer to identify an uplink component carrier utilized to convey the scheduling request, code for causing the at least one computer to select an anchor component carrier from a plurality of component carriers based upon the uplink component carrier, and code for causing the at least one computer to transmit control information to the mobile device on the anchor component carrier.

Still another aspect relates to a wireless computer apparatus that includes at least one processor. The at least one processor can be configured to receive a scheduling request from a mobile device, transmit control information to the mobile device on a first component carrier, identify whether the control information is received by the mobile device, and retransmit the control information to the mobile device on a second component carrier when the control information is not received.

In accordance with another aspect, an apparatus is described. The apparatus can include a memory that retains instructions related to receiving a scheduling request from a mobile device, identifying an uplink component carrier utilized to convey the scheduling request, selecting an anchor component carrier from a plurality of component carriers based upon the uplink component carrier, and transmitting control information to the mobile device on the anchor component carrier. The apparatus can also include a processor, coupled to the memory, configured to execute the instructions retained in the memory To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
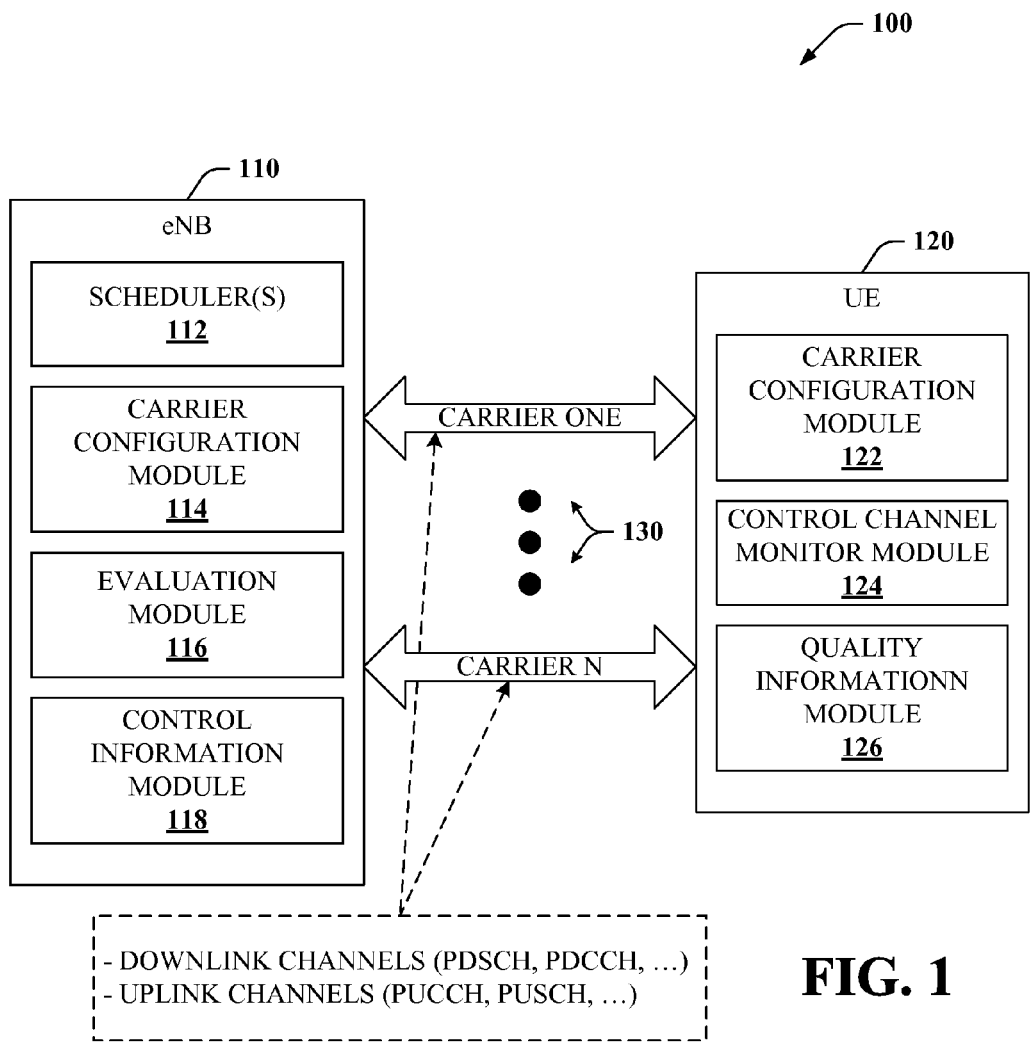
FIG. 1 illustrates an example wireless communication system that facilitates indicating a failure of a component carrier in a multi-carrier environment in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to the drawings, FIG. 1 illustrates an example wireless communication system 100 that facilitates indicating a failure of a component carrier in a multi-carrier environment in accordance with various aspects. Wireless communication system 100 includes an eNodeB (eNB) 110 and user equipment 120 that communicate with one another over a wireless link. In one example, eNB 110 can be an access point, such as a macrocell access point, femtocell or picocell access point, a NodeB, an eNodeB, a base station, a mobile base station, a portion thereof, and/or substantially any device or apparatus that provides access for UEs to a wireless communication network. While only one UE 120 and eNB 110, respectively, are illustrated in FIG. 1, it should be appreciated that system 100 can include any number of UEs and/or eNBs. In accordance with an aspect, eNB 110 can transmit information to UE 120 over a forward link or downlink channel and UE 120 can transmit information to eNB 110 over a reverse link or uplink channel. It should be appreciated that system 100 can operate in an WCDMA wireless network, an OFDMA wireless network, a CDMA network, a 3GPP LTE or LTE-A wireless network, a 3GPP2 CDMA2000 network, an EV-DO network, a WiMAX network, a HSPA network, etc.

In an aspect, eNB 110 and UE 120 can be configured to employ multiple component carriers. For example, eNB 110 and UE 120 can communicate via a plurality of component carriers 130, denoted carrier 1 through carrier N, where N is an integer greater than or equal to one. While two carriers are depicted in FIG. 1, it is to be appreciated that eNB 110 and UE 120 can be configured to operate with a single carrier, two carriers, three carriers, and so on, up to a maximum number of component carriers available to system 100.

Each carrier in the plurality of carriers 130 can encapsulate a complete radio interface. For instance, each carrier in the plurality of carriers 130 can respectively include an LTE or LTE-A radio interface, such that the plurality of carriers 130 respectively include a plurality of downlink and uplink logical, transport, and physical channels, such as, but not limited to, a physical downlink shared channel (PDSCH), a physical downlink control channel (PDCCH), a physical uplink shared channel (PUSCH), a physical uplink control channel (PUCCH), a physical broadcast channel (PBCH), and the like. Thus, UE 120 can receive complete wireless communication services via one carrier of the plurality carriers 130. In addition, greater data rates can be achieved through utilization of two or more carriers of the plurality of carriers 130. In one example, the plurality of component carriers 130 can be an aggregation of LTE Release 8 carriers (or carriers of another wireless communication system), wherein a legacy UE can utilize a single component carrier, while an advanced UE can employ one or more component carriers. While LTE or LTE-A component carriers and channels are described above, it is to be appreciated that the attached claims are not limited to such systems and that the plurality of carriers 130 can be WCDMA carriers, HSPA carriers, CDMA 2000 carriers, etc.

In an aspect, at least one carrier of the plurality of carriers 130 can be designated an anchor carrier or primary component carrier (PCC) of UE 120. While each component carrier can include a complete radio interface, designating an anchor carrier can reduce system overhead. For instance, each carrier can include control signaling to support operation of that carrier, while the anchor carrier can carry additional signaling (e.g., paging signals, synchronization signals, system broadcasts, etc.) that support the entire system. In another example, each carrier can include user data, while control signaling, for all configured carriers, is provided only on the anchor carrier. It is to be appreciated that the anchor carrier can be cell-specific (e.g., all UEs served by eNB 110 employ the same carrier as anchor) or UE-specific (e.g., each UE utilizes disparate carriers as anchor). Moreover, it is to be appreciated that two or more anchor carriers can be designated for each UE.

Figure 2:
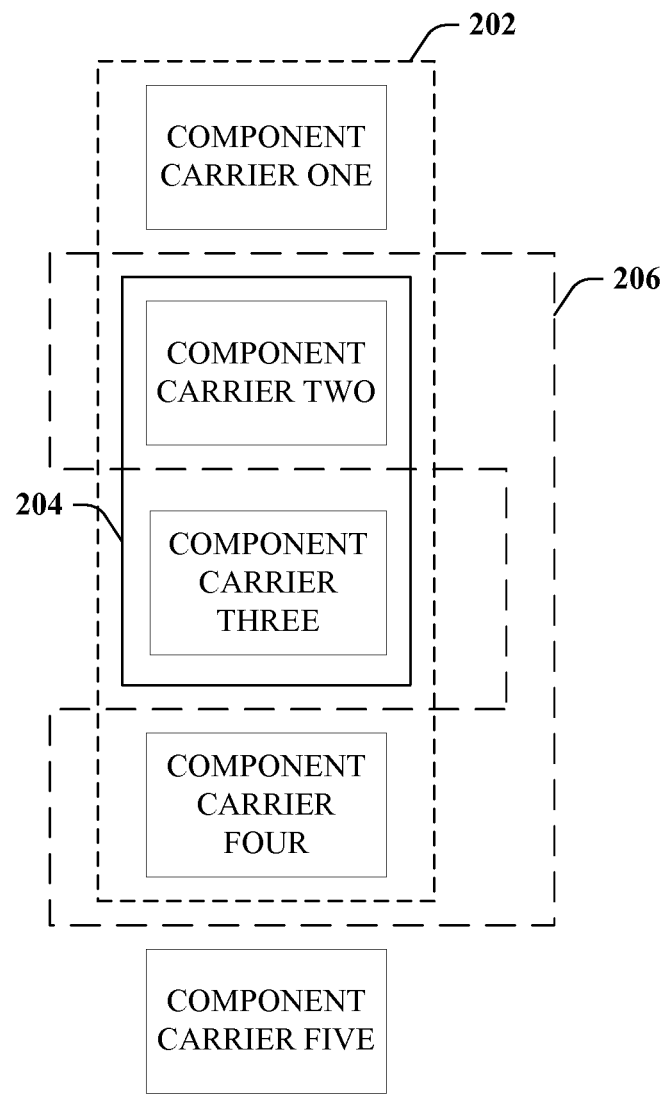
FIG. 2 is an illustration of component carrier configurability in accordance with various aspects.

Turning briefly to FIG. 2, a set of component carriers is depicted. The set of component carriers includes carriers one through five. While only five component carriers are illustrated in this example, it is to be appreciated that fewer or more component carriers can be available, and the claimed subject matter is intended to cover any number of component carriers. The set of component carriers can be configured in a variety of ways for a UE, such as UE 120. For example, a subset 202 of component carriers can include configured downlink component carriers. Downlink component carriers include at least downlink user data conveyed on a downlink channel such as PDSCH. Another subset 204, comprising component carriers two and three, can include configured uplink component carriers. Uplink component carries include at least uplink user data conveyed on an uplink channel such as PUSCH. Further, a subset 206 can include component carriers designated as anchor or primary component carriers. As discussed above, anchor carriers convey control signaling as well as user data. For example, anchor carriers 206 can include control channels such as PDCCH and PUCCH.

As shown in FIG. 2, subsets 202, 204, and 206 can overlap. For instance, a component carrier, such as component carrier two, can be a downlink component carrier, an uplink component carrier, and an anchor component carrier. A component carrier, such as component carrier three, can be a downlink component carrier and an uplink component carrier, but not an anchor carrier. Further, a component carrier, such as carrier four, can be a downlink component carrier and an anchor carrier, but not an uplink component carrier. In addition, a component carrier, such as a component carrier five, can remain unconfigured such that the carrier is not employed by a particular UE. The subsets depicted in FIG. 2 are one possible allocation of component carriers for a UE and is intended illustrate the configurability of component carriers between a base station and a UE. It is to be appreciated that other combinations of downlink component carriers, uplink component carriers, and/or anchor carriers can be configured such that subsets 202, 204, and 206 comprise different component carriers than those depicted in FIG. 2.

Turning back to FIG. 1, in a single-carrier configuration, a connection between eNB 110 and UE 120 can be disrupted or lost resulting in a radio link failure. For example, a channel quality (e.g., a signal-to-noise ratio, interference level, or other similar metric) can drop below a predetermined threshold. The predetermined threshold can be established by an operator of a network based upon network robustness or other considerations. Upon identification of a radio link failure, UE 120 can initiate recovery procedures.

In a multi-carrier configuration, a radio link failure can occur with a loss of an anchor component carrier (e.g., a preferred component carrier). However, a partial failure can occur with a loss of channel quality on one or more component carriers. In an aspect, a partial failure can be detected when a loss of channel quality affects a subset of the plurality of component carriers 130. In one aspect, when the affected subset includes the anchor carriers, a partial failure is determined Upon identification of a partial failure, UE 120 can initiate recovery mechanisms. For example, UE 120 can initiate a connection re-establishment procedure. In another example, UE 120 can initiate a random access procedure to establish a new connection.

In another aspect, the affected subset can include at least one anchor carrier, but not all component carriers which UE 120 is configured to monitor. The carriers not included in the affected subset can include at least one anchor component carrier; alternatively, the affected subset can include all anchor component carriers. Accordingly, UE 120 does not necessarily lose complete control signaling coverage, but can fail to receive control signaling from eNB 110 when sent on an affected anchor component carrier. To mitigate impact from a loss of channel quality on an anchor carrier, eNB 110 and UE 120 can coordinate to identify and avoid anchor carriers experiencing radio link failure. For instance, UE 120 can notify eNB 110 on the condition of one or more anchor carriers. In addition, UE 120 can indicate a preferred anchor carrier on which to receive control signaling from eNB 110. In another example, eNB 110 can perform a trial-and-error procedure, wherein eNB 110 can cycle through anchor carriers until UE 120 acknowledges control signaling.

As shown in FIG. 1, eNB 110, according to an aspect, can include a scheduler(s) 112, a carrier configuration module 114, an evaluation module 116, and a control information module 118. Scheduler 112 can allocate resources on a link (e.g., downlink or uplink) to UE 120 (and/or any other UEs (not shown) served by eNB 110). In an aspect, the plurality of carriers 130 can be individually scheduled such that eNB 110 includes a plurality of schedulers 112, each associated with a particular carrier. In another aspect, the plurality of carriers 130 can be jointly scheduled by scheduler 112. Carrier configuration module 114 can establish a subset of carriers from the plurality of carriers 130 that UE 120 monitors. Further, carrier configuration module 114 can activate and/or deactivate downlink and uplink component carriers. In addition, carrier configuration module 114 can designate one or more carriers as anchor carriers for UE 120.

In one aspect, eNB 110 can receive carrier quality information from UE 120. The carrier quality information can indicate, to eNB 110, a channel quality on a plurality of carriers. The plurality of carriers, for which carrier quality information is provided, can be anchor carriers monitored by UE 120 and/or all carriers monitored by UE 120. The carrier quality information can include metrics on channel quality for respective component carriers. For instance, the carrier quality information can include signal-to-noise ratios (SNR), interference levels, etc., regarding one or more component carriers. In another example, the carrier quality information can include a set of flags, wherein each flag indicates whether or not UE 120 has coverage on a particular component carrier. In yet another example, the carrier quality information can comprise an identifier or index associated with a component carrier preferred by UE 120.

Evaluation module 116 can analyze the carrier quality information conveyed by UE 120 to determine states of the plurality of component carriers 130 from the perspective of UE 120. In an aspect, evaluation module 116 can rank component carriers in terms of channel quality. Such a ranking of component carriers can enable eNB 110 to favor component carriers providing the best channel conditions. In another aspect, evaluation module 116 can identify component carriers with poor channel conditions. Based upon this information, eNB 110, and particularly, carrier configuration module 114 can update a set of component carriers monitored by UE 120.

Control information module 118 can generate control signaling which is transmitted to UE 120 on a control channel, such as PDCCH, on one or more carriers of the plurality of carriers 130. Control signaling can comprise downlink control information such as scheduling information, resource assignment information, uplink scheduling grants, uplink transport formats, information that facilitates demodulation and decode of user data, hybrid automatic repeat request (ARQ) acknowledgements, power control commands, and the like. Control signaling can be transmitted on a PDCCH of one or more anchor carriers monitored by UE 120.

UE 120 can include a carrier configuration module 122, a control channel monitor module 124, and a quality information module 126. Carrier configuration module 122 can receive control signaling from eNB 110 which establishes downlink component carriers, uplink component carriers, and anchor component carriers to be monitored by UE 120. Carrier configuration module 122 can facilitate activation and deactivation of component carriers employed by UE 120 to receive and transmit information.

Control channel monitor module 124 monitors channel quality of one or more carriers monitored by UE 120. Control channel monitor module 124 can measure a channel quality on a set of anchor carriers to ascertain an SNR associated with each respective anchor carrier. In another example, control channel monitor module 124 can determine channel quality on any component carrier which UE 120 is configured to monitor by carrier configuration modules 114 and/or 122. Quality information module 126 can generate carrier quality information based upon information provided by the control channel monitor module 124. The carrier quality information can indicate a channel quality on a plurality of carriers. The plurality of carriers, for which carrier quality information is provided, can be anchor carriers monitored by UE 120 and/or all carriers monitored by UE 120. The carrier quality information can include metrics on channel quality for respective component carriers. For instance, the carrier quality information can include SNRs, interference levels, etc., regarding one or more component carriers. In another example, the carrier quality information can include a set of flags, wherein each flag indicates whether or not UE 120 has coverage on a particular component carrier. In yet another example, the carrier quality information can comprise an identifier or index associated with a component carrier preferred by UE 120.

According to an example, UE 120 can detect a loss of channel quality on at least one anchor component carrier. While UE 120 is configured, by eNB 110, to monitor and utilize the plurality of component carriers 130, a subset of the plurality of component carriers 130 is designated as anchor or primary component carriers. It is to be appreciated that the subset of carrier designated as anchor carriers can encompass the plurality of component carriers 130, or the subset of carriers designated as anchor carriers can include one or more carriers, but not all carriers, from the plurality of carriers 130. In detecting a loss of channel quality, control channel quality monitor module 124 can identify when channel quality drops below a predetermined threshold for a given anchor component carrier. For instance, the control channel quality monitor can compare the channel quality of the given anchor component carrier to the predetermined threshold. The predetermined threshold can be a configured parameter established, by eNB 110, during connection setup, an operator supplied parameter tuned to a particular network implementation, and/or a learned value based upon past performance information collected by UE 120. Quality information module 126 can generate carrier quality information that reflects the loss of channel quality. For instance, quality information module 126 can generate a bitmap, wherein each bit position corresponds to a respective anchor component carrier. Each bit of the bitmap indicates whether the corresponding anchor component carrier retains coverage or has lost coverage. In another aspect, quality information module 126 can generate channel quality information (CQI) reports relative to each anchor component carrier and/or each component carrier of the plurality of carriers 130. The CQI reports can indicate component carriers experiencing a loss of channel quality. In yet another aspect, the quality information module 126 can generate information which indicates a component carrier index or identifier that specifies an anchor component carrier that maintains a reliable channel quality. In addition, the carrier index or identifier can specify a preferred anchor component carrier, wherein the preferred anchor component carrier is not an anchor carrier experiencing loss of channel quality. Moreover, quality information module 126 can generate a detailed message which can be conveyed via higher layer signaling (e.g., RRC signaling, layer 3 signaling, etc.). The detailed message can include channel quality information on one or more carriers of the plurality of carriers 130. For instance, the detailed message can include channel quality measurements over a period of time.

According to another example, eNB 110 can receive and evaluate carrier quality information transmitted by UE 120, wherein the carrier quality information indicates a loss of channel quality on at least one anchor carrier monitored by UE 120. In response to the carrier quality information, eNB 110 can transmit control information provided by control information module 118 on a component carrier having a reliable channel quality relative to UE 120. In another aspect, the carrier quality information can be a flag transmitted on a particular uplink component carrier. The flag notifies eNB 110 that control information should be transmitted on a downlink component carrier or anchor component carrier that is implicitly linked to the particular uplink component carrier. In yet another aspect, eNB 110 can utilize higher level signaling (e.g., layer 3 signaling) to receive carrier quality information. To employ higher level signaling, eNB 110 transmits a scheduling assignment to UE 120 which allocates uplink resources for the carrier quality information. When transmitting the scheduling assignment, eNB 110 can retransmit the assignment on a different anchor component carrier should a previous transmission on one carrier fail. A retransmission decision can be implicit and/or explicitly determined For instance, eNB 110 can retransmit a scheduling assignment when an acknowledgement is not received (e.g., due to loss of channel quality on a component carrier). In another example, UE 120 can transmit an explicit notification to eNB 110 to retry on another anchor component carrier.

According to a further aspect, eNB 110 can alter a carrier configuration associated with UE 120 based upon the carrier quality information. For instance, eNB 110 can employ carrier configuration module 114 to deactivate failing component carriers and/or activate component carriers having reliable channel quality. In another example, carrier configuration module 114 can undesignated carriers with poor control channel quality as anchor carriers and designate new carriers has anchors when carrier quality information indicates reliable control channel quality on the new carriers. Moreover, while the above failure indication and recovery mechanisms have been describe in connection with LTE-A, it is to be appreciate that 3GPP LTE, UMTS, CDMA, CDMA2000, HSPA, WCDMA, WiMAX, WiFi, and/or other technologies can utilize concepts described herein to improve control channel reception.

Figure 3:
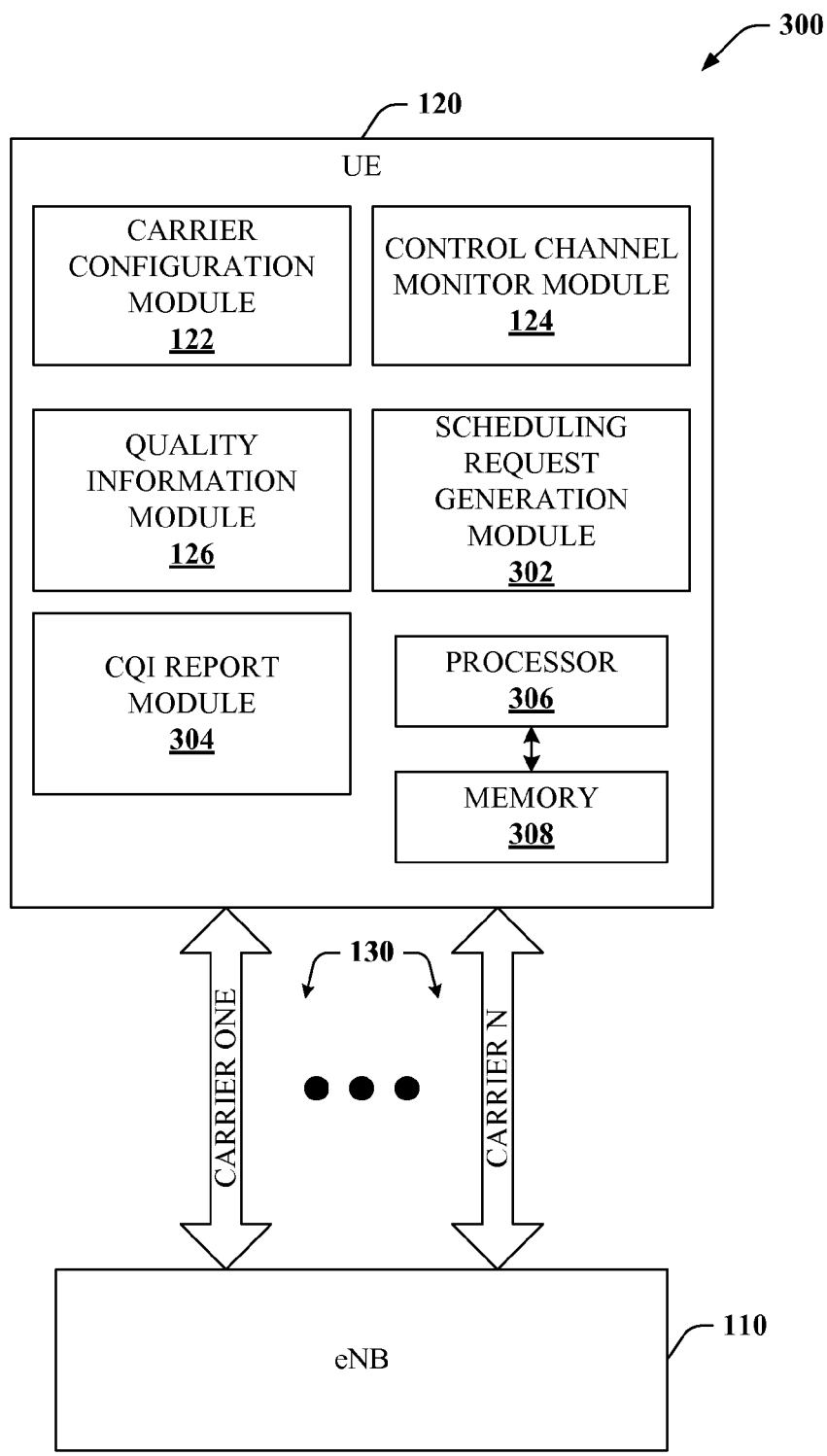
FIG. 3 is an illustration of an example system that facilitates notifying a wireless communication network of a loss of channel quality on a component carrier in accordance with various aspects.

Referring to FIG. 3, a system 300 is illustrated that facilitates notifying a wireless communication network of a loss of channel quality on a component carrier in accordance with various aspects. System 300 can include eNB 110 and UE 120, which communicate via a plurality of component carriers 130. eNB 110 can configure UE 120 to utilize a subset of the plurality of component carriers 130 as a plurality of anchor carriers.

UE 120 can include carrier configuration module 122, control channel monitor module 124, and quality information module 126, as described above with reference to FIG. 1. In addition, UE 120 can include a scheduling request generation module 302 that can construct a scheduling request to be included in layer 2 signaling, such as uplink control information conveyed on PUCCH and/or PUSCH. The scheduling request can incorporate additional bits of information generated based upon carrier quality information provided by quality information module 126. For example, the additional bits of information can include a bitmap, wherein each bit position is associated with a corresponding component carrier. Scheduling request generation module 302 can establish values for each bit of the bitmap based upon whether the corresponding component carrier possesses reliable channel quality as indicated in the carrier quality information. In another example, the additional bits of information can include indices or identifiers associated with particular component carriers with reliable channel quality. As this information is transmitted as part of a scheduling request, the information is readily available to eNB 110 when scheduling UE 120 on the downlink and/or uplink. In addition, eNB 110 can utilize the information to efficiently transmit scheduling assignments and other control information to UE 120.

In another aspect, UE 120 can transmit the scheduling request generated by the scheduling request generation module 302 on a particular uplink component carrier. An identifier associated with the uplink component carrier on which the scheduling request is transmitted notifies eNB 110 of an appropriate anchor component carrier on which to transmit a scheduling assignment. For instance, a mapping between uplink component carrier index and anchor carrier index can be configured. The mapping can be cell-specific (shared by all UEs served by eNB 110) or UE-specific (configured separately for each UE served by eNB 110). In an aspect, a flag can be incorporated in the scheduling request to indicate a desire to employ the configured mapping. Alternatively, the mapping can be utilized as a default behavior.

UE 120 can further include a CQI report module 304 that generates a control channel CQI report relative to at least the plurality of anchor carriers. CQI report module 304 can be configured to generate reports periodically and/or based upon trigger events such as a significant change in control channel quality of a given component carrier. In another aspect, CQI report module 304 can generate a CQI report on each carrier of the plurality of carriers 130 in addition to the plurality of anchor carriers. A broad CQI report can enable eNB 110 to dynamically modify the plurality of anchor carriers such that component carriers having the most reliable channel quality are selected as anchor carriers.

As further illustrated in system 300, UE 120 can include a processor 306 and/or a memory 308, which can be utilized to implement some or all the functionality of carrier configuration module 122, control channel monitor module 124, quality information module 126, scheduling request generation module 302, CQI report module 304, and/or other functionality of UE 120.

Figure 4:
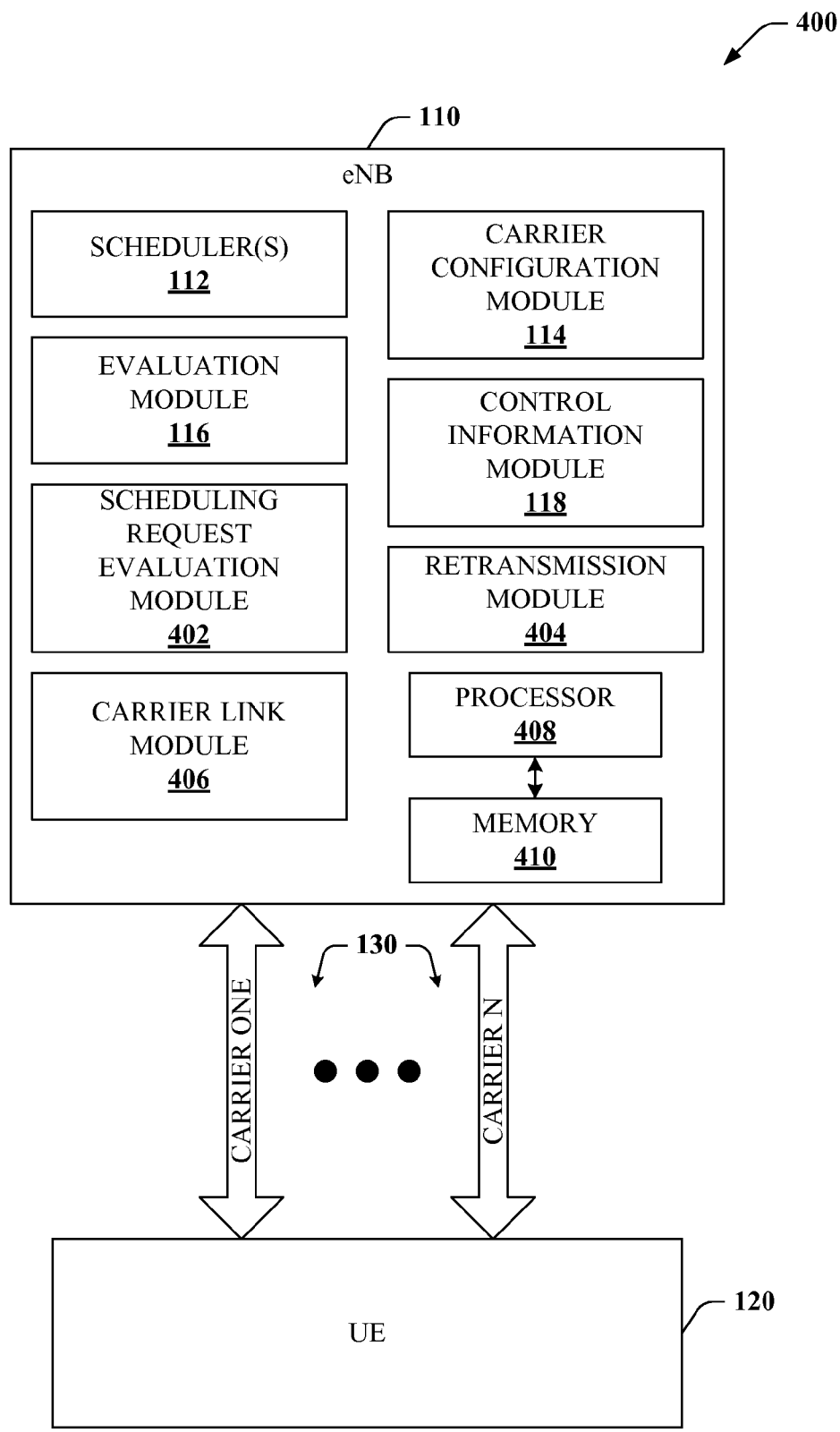
FIG. 4 is an illustration of an example system that facilitates reconfiguration and/or recovery during a loss of channel quality on a component carrier in accordance with one or more aspects.

Turning now to FIG. 4, illustrated is a system 400 that facilitates reconfiguration and/or recovery during a loss of channel quality on a component carrier in accordance with one or more aspects. System 400 can include eNB 110 and UE 120, which communicate via a plurality of component carriers 130. eNB 110 can configure UE 120 to utilize a subset of the plurality of component carriers 130 as a plurality of anchor carriers.

eNB 110 can include scheduler 112, carrier configuration module 114, evaluation module 116, and control information module 118, as described above with reference to FIG. 1. In addition, eNB 110 can include a scheduling request evaluation module 402. In one aspect, the scheduling request evaluation module 402 can identify when one or more anchor component carriers are indicated in a scheduling request transmitted by UE 120. eNB 110 can utilize the indicated anchor component carriers to convey downlink control information to UE 120. In another aspect, the scheduling request evaluation module 402 can analyze a bitmap incorporated in the scheduling request. Each bit of the bitmap can indicate whether a corresponding component carrier has a reliable channel quality. The scheduling request evaluation module 402 can identify reliable component carriers based upon the bitmap.

In another aspect, the scheduling request evaluation module 402 can identify a particular anchor component carrier specified in a scheduling request. The scheduling request can include an index associated with, or an identity assigned to, the particular anchor carrier. An identity of an anchor carrier included in a scheduling request can be utilized by a retransmission module 404 include in eNB 110, according to an aspect. Carrier quality information can be conveyed, by UE 120, via upper layer signaling, such as radio resource control (RRC) or other layer 3 signaling. To enable UE 120 to transmit the carrier quality information, scheduler 112 assigns resources to UE 120. The assigned resources are specified in downlink control information generated by control information module 118 and transmitted to UE 120 on a control channel associated with at least one of the plurality of anchor carriers configured for UE 120.

A possibility exists that the control channel selected to convey the control information is associated with a component carrier experiencing a loss of channel quality. Retransmission module 404 facilitates retransmission of control information to ensure reception by UE 120. In one aspect, retransmission module 404 can implement a trial-and-error approach. For instance, should an initial transmission fail to reach UE 120, retransmission module 404 can cycle through configured anchor carriers until UE 120 acknowledges receipt of the control information. In another aspect, retransmission module 404 can obtain the anchor carrier identity included in a scheduling request evaluated by the scheduling request evaluation module 402. Retransmission module 404 can subsequently attempt a transmission of control information on the identified anchor carrier. In yet another aspect, retransmission module 404 can infer a non-acknowledgment by UE 120. For instance, eNB 110 can detect that scheduled resources are unutilized in a particular subframe despite being assigned to UE 120. Accordingly, retransmission module 404 can attempt to transmit the control information, including the scheduling assignment, on another component carrier. In another aspect, UE 120 can incorporate a non-acknowledgement into a scheduling request. For example, the scheduling request can include additional bits that indicate, to eNB 110, that another carrier should be utilized to transmit control information. Retransmission module 404 can employ the additional bits as a trigger to initiate a retransmission on a different component carrier.

eNB 110 can include a carrier link module 406 which utilizes an implicit association between uplink carriers and downlink carriers (or anchor carriers) to ensure reliable delivery of control information. For example, the carrier link module 406 can configure a mapping between uplink carrier indices or identities and anchor carrier indices or identities. The mapping provides links between an uplink component carrier carrying uplink control information, such as scheduling request, and an anchor carrier on which downlink control information, including scheduling assignments, is to be transmitted. eNB 110 can utilize the carrier link module 406 to identify an anchor carrier to employ to transmit downlink control information. For instance, the carrier link module 406 can query the mapping to identify the appropriate anchor carrier. In one aspect, the eNB 110 can employ the carrier link module 406 by default. In another aspect, eNB 110 can utilize the carrier link module 406 when a scheduling request includes a flag indicating a desire, on behalf of UE 120, to utilize the mapping. For example, UE 120 can observe a loss of channel quality on a particular carrier. In response, UE 120 can transmit a resource request on a particular uplink control channel with a scheduling request that asserts the flag. In this manner, eNB 110 and UE 120 can coordinate to ensure that UE 120 reliably receives control information.

As further illustrated in system 400, eNB 110 can include a processor 408 and/or a memory 410, which can be utilized to implement some or all the functionality of scheduler 112, carrier configuration module 114, evaluation module 116, control information module 118, scheduling request evaluation module 402, retransmission module 404, carrier link module 406, and/or other functionality of eNB 110.

Figure 5:
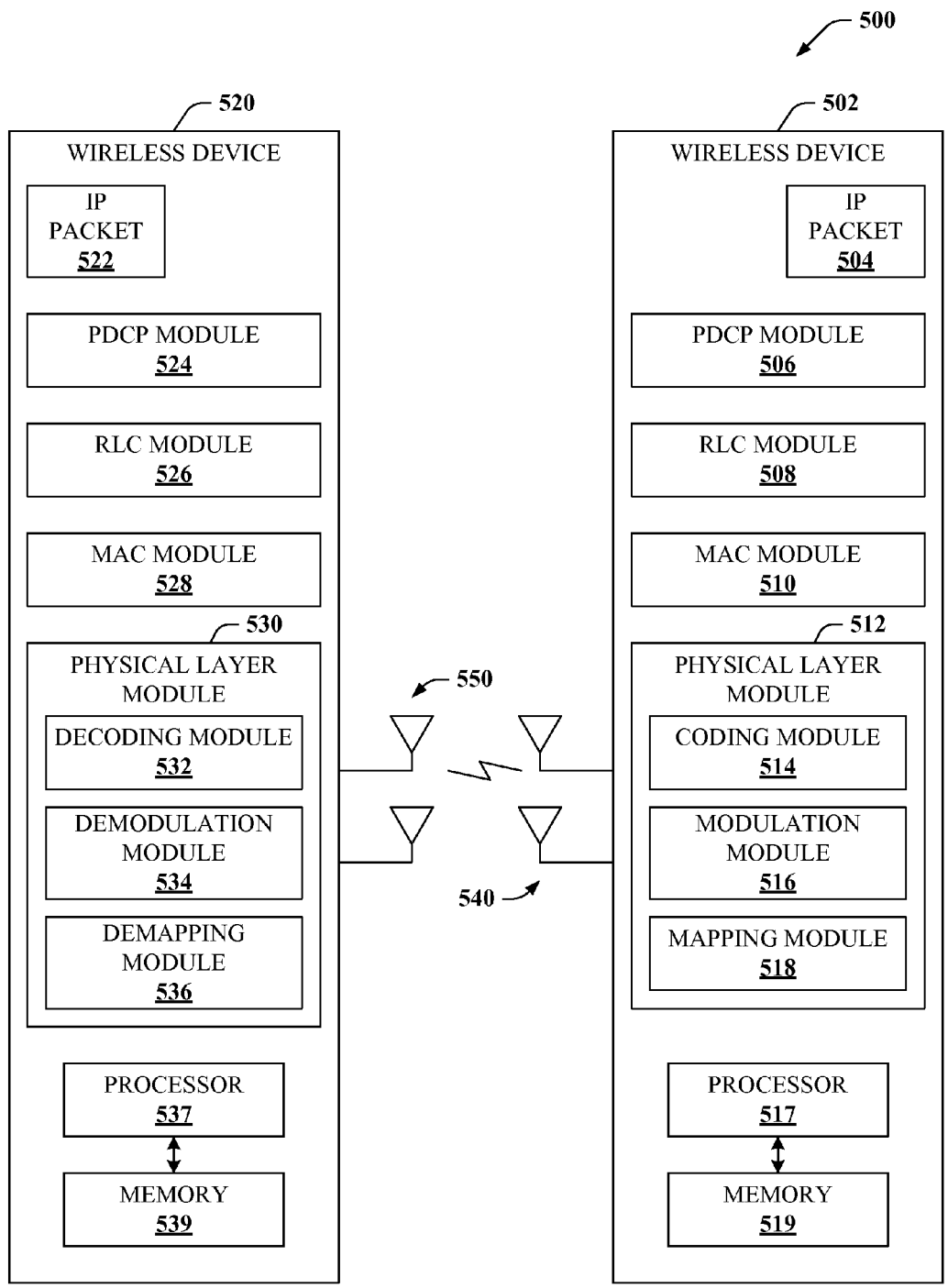
FIG. 5 is an illustration of an example system that depicts a data flow employable for notification of and recovery from a failure of a component carrier in a multi-carrier environment according to various aspects.

Referring now to the drawings, FIG. 5 illustrates an example wireless communication system 500 that depicts a data flow employable for notification of and recovery from a failure of a component carrier in a multi-carrier environment according to various aspects. System 500 includes wireless devices 502 and 520 that communication with one another over a wireless network. In one example, wireless devices 502 and/or 520 can be an access point, such as a macrocell access point, femtocell or picocell access point, eNB, mobile base station, a portion thereof, and/or substantially any device or apparatus that provides access to a wireless network. In another example, wireless devices 502 and/or 520 can be a mobile device, such as a UE, a portion thereof, and/or substantially any device or apparatus that receives access to a wireless network.

Wireless device 502 can comprise multiple communication layers to facilitate transmitting/receiving data with wireless device 520. For example, wireless device 5102 can include a packet data convergence protocol (PDCP) module 506 that can compress packet headers and facilitate ciphering and integrity protection of data. Wireless device 502 can also include a radio link control (RLC) module 508 that effectuates segmentation/concatenation, retransmission handling, and in-sequence delivery to higher layers, a medium access control (MAC) module 510 that enacts logical channel multiplexing, hybrid automatic repeat request (HARQ) retransmissions, scheduling, and a physical layer module 512 that manages coding/decoding, modulation/demodulation, and antenna/resource mapping. Similarly, wireless device 520 can include a PDCP module 524, an RLC module 526, a MAC module 528, and physical layer module 530 that provide the same or similar functionality.

According to an example, wireless device 502 can transmit an Internet Protocol (IP) packet 504 to wireless device 520 via a wireless channel. The wireless channel can be a downlink channel or an uplink channel. Higher layers (not shown) of wireless device 502 can generate IP packet 504 or otherwise receive IP packet 504 for transmitting to one or more devices. Higher layers can include an application layer, an IP layer, and/or the like. PDCP module 506 can receive IP packet 504 from higher layers and generate one or more PDCP service data units (SDUs). PDCP module 506 can perform IP header compression on IP packet 504. In addition, PDCP module 506 can cipher IP packet 504 and/or provide integrity protection on IP packet 504. PDCP module 506 can further generate a PDCP protocol data unit (PDU) by combining a compressed and ciphered IP packet 504 (e.g., a PDCP SDU) with a PDCP header that includes at least a sequence number related to the PDCP SDU. The PDCP PDU can be provided to RLC module 508, which can segment and concatenate one or more PDCP PDUs into an RLC PDU along with an RLC header. For instance, based upon a resource scheduling decision, a particular amount of data is elected for transmission from an RLC buffer managed by RLC module 508, which segments and concatenates one or more PDCP PDUs to generate the RLC PDU.

RLC module 508 provides the RLC PDU to MAC module 510, which offers MAC layer services (e.g., multiplexing, HARQ retransmissions, scheduling, etc.) to RLC module 508 in the form of logical channels. A logical channel can be characterized based upon the type of information carried. For instance, logical channels offered by MAC module 510 can include a broadcast control channel (BCCH) which carries system information from a wireless network to mobile devices, a paging control channel (PCCH) utilized for paging mobile devices, a common control channel (CCCH) which carries control information in conjunction with random access, a dedicated control channel (DCCH) which carries control information to and/or from mobile devices, a dedicated traffic channel (DTCH) utilized for user data to and/or from mobile devices, and a multicast control channel (MCCH) utilized carries control information in connection with a multicast traffic channel (MTCH), which carries transmission of multimedia broadcast multicast services.

MAC module 510 can map logical channels to transport channels, which represent services provided by physical layer module 512. Data on a transport channel is organized into transport blocks. For a given transmission time interval (TTI), one or more transport blocks are transmitted over a radio interface. In one example, MAC module 510 multiplexes RLC PDUs into one or more transport blocks.

The transport blocks can be provided to physical layer module 512, which facilitates coding, modulation, multi-antenna processing, and/or mapping of a signal to physical time-frequency resources (e.g., resource elements). According to an example, physical layer module 512 can introduce a cyclic redundancy check (CRC) to a transport block to facilitate error detection. In addition, physical layer module 512 can include a coding module 514 that codes bits of the transport block. In one example, Turbo coding can be employed by the coding module 514. Physical layer module 512 can include a modulation module 516 that modulates the coded bits to generate symbols. Physical layer module 512 can utilize a mapping module 518 to configure antennas to provide different multi-antenna transmission schemes such as transmit diversity, beamforming, and/or spatial multiplexing. In addition, the mapping module 518 can map symbols to physical resource elements to enable transmission over the air.

Wireless device 502 can utilize one or more antenna(s) 540 to transmit IP packet 504 to wireless device 520 which can receive the transmission via antenna(s) 550. While FIG. 5 depicts two antennas respectively associated with wireless devices 502 and 520, it is to be appreciated that wireless device 502 and 520 can include substantially any number of antennas. After reception of IP packet 504 from wireless device 504, wireless device 520 can employ physical layer module 530 to decode and demodulate a transmission. For example, the physical layer module 530 can include a demapping module 536 that demaps resources elements to recover a set of symbols. Physical layer module 530 can also employ a demodulation module 534, which demodulates the set of symbols to recover a set of coded bits. In addition, a decoding module 532 is included in physical layer module 530 to decode the set of coded bits to generate a transport block. The transport block can be provided to MAC module 528 to manage a HARQ retransmission, if necessary due to errors (e.g., decode errors, transmission errors, etc.) and to facilitate MAC demultiplexing to generate one or more RLC PDUs. The one or more RLC PDUs can be provided to RLC module 526 for reassembly. For instance, the RLC PDUs can comprise one or more RLC SDUs and/or portions thereof Accordingly, the RLC module 526 reconstructs the RLC SDUs from the RLC PDUs. The reassembled RLC SDUs can be processed by PDCP module 524, which deciphers and decompresses the RLC SDUs to recover one or more data packets such as IP packet 522.

It to be appreciated that wireless device 520 can utilize similar functionality and/or similar modules as wireless device 502 to transmit a data packet to wireless device 502. Further, wireless device 502 can employ similar components and/or functionality described above with reference to wireless device 520 to receive a transmission from disparate devices, such as wireless device 520. As further illustrated in system 500, wireless device 502 can include a processor 517 and/or a memory 519, which can be utilized to implement some or all of the functionality of PDCP module 506, RLC module 508, MAC module 510, and physical layer module 512. Similarly, FIG. 5 illustrates that wireless device 520 can also include a processor 537 and/or a memory 539, which can be employed to implement some or all of the functionality of PDCP module 524, RLC module 526, MAC module 528, and physical layer module 530.

Figure 6:
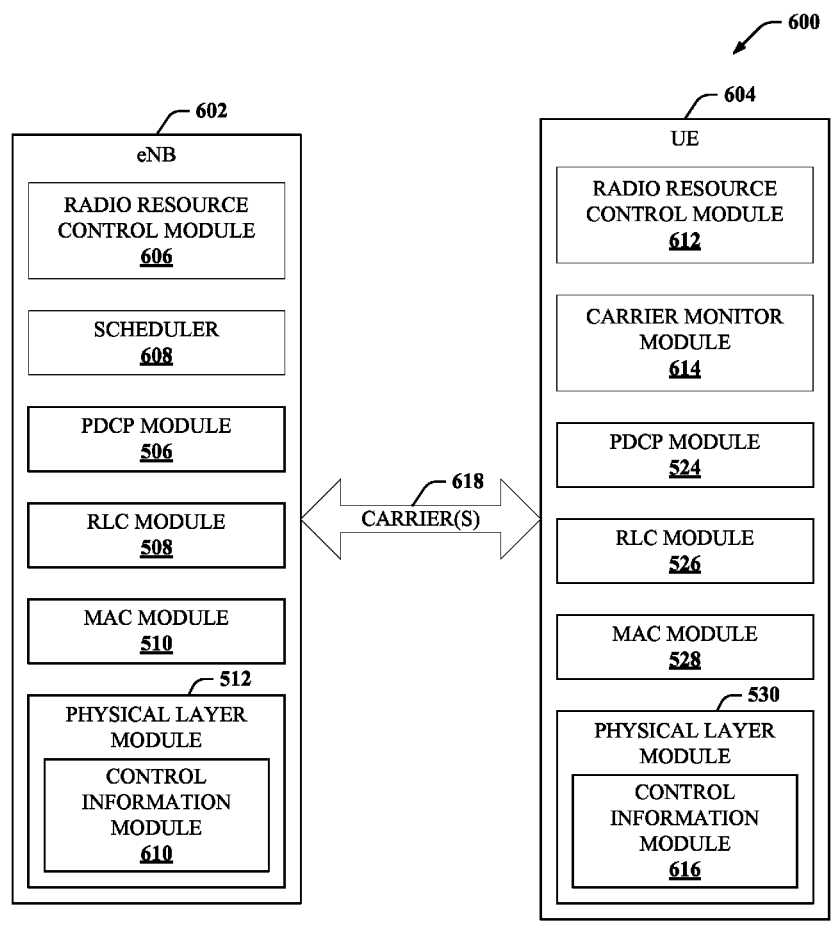
FIG. 6 is an illustration of an example system that facilitates indicating a failure of a component carrier in a multi-carrier environment in accordance with various aspects.

Turning now to FIG. 6, illustrated is a system 600 that facilitates indicating a failure of a component carrier in a multi-carrier environment in accordance with various aspects. System 600 can include an eNB 602 and a UE 604. eNB 602 and UE 604 can be similar to eNB 110 and UE 120, respectively, as described above with respect to previous figures. eNB 602 can include PDCP module 506, RLC module 508, MAC module 510, and physical layer module 512 described supra. In addition, UE 604 can include PDCP module 524, RLC module 526, MAC module 528, and physical layer module 530.

In one aspect, eNB 602 can communicate with UE 604 over a wireless link. The wireless link can include a set of component carriers 618. The set of component carriers 618 can include a subset of downlink component carriers, a subset of uplink component carriers, and/or a subset of anchor component carriers. eNB 602 can include a radio resource control (RRC) module 606 which can configure the set of component carriers 618 as well as the subsets. In one example, RRC module 606 can communicate with RRC module 612 of UE 604, via RRC signaling, to establish the various sets and subsets of component carriers.

eNB 602 includes a scheduler 608 which can assign uplink and/or downlink resources to UE 604. Based upon scheduling decisions by scheduler 608, a control information module 610 included in physical layer module 512 can generate control information. The control information can be transmitted by physical layer module 512 on at least one anchor carrier from the subset of anchor carriers. In an aspect, UE 604 can lose coverage (e.g., loss of channel quality) on one or more anchor carriers from the subset of anchor carriers. Accordingly, UE 604 can potentially fail to receive control information transmitted by eNB 602. When UE 604 fails to receive the control information, physical layer module 512 can retransmit the control information on a second anchor carrier until UE 604 obtains the control information. In another example, the different anchor carrier can be a carrier specified by UE 604 in control signaling such as a scheduling request.

UE 604 can include a carrier monitor module 614 that monitors a control channel quality on each carrier of the set of carriers 618. Measurements made by the carrier monitor module 614 can be incorporated as carrier quality information into layer 2 signaling (e.g., uplink control information) generated by control information module 616. In one example, control information module 616 can incorporate carrier quality information into a scheduling request. For instance, control information module 616 can include, in a scheduling request, carrier identifiers associated with anchor carriers having reliable channel quality. According to another example, the scheduling request can include a bitmap indicating which anchor carriers have reliable channel quality and which anchor carriers have a loss of channel quality. Control information module 616 can additionally incorporate carrier quality information as CQI reports periodically transmitted to eNB 602.

In another aspect, carrier monitor module 612 can generate carrier quality information as an IP packet which is transmitted to eNB 602 in accordance with the data flow described supra with respect to FIG. 5. To transmit the IP packet, UE 604 requests resources on a component carrier via a scheduling request. The scheduling request can include an identifier of a preferred component carrier on which control information should be transmitted by eNB 602. In another example, the scheduling request can include a flag which indicates to eNB 602 that an implicit mapping should be utilized. The implicit mapping links an identity of a uplink carrier on which a scheduling request is transmitted to an identity of an anchor carrier on which downlink control information is transmitted. Accordingly, UE 604 can transmit the scheduling request on an uplink carrier linked to a downlink component carrier experiencing reliable channel quality.

Referring to FIGS. 7-10, methodologies are described related to facilitating indication of a loss of channel quality of a component carrier in multi-carrier configurations. The methodologies can be implemented by systems 100, 300, 400, 500, and/or 600 described above. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 7:
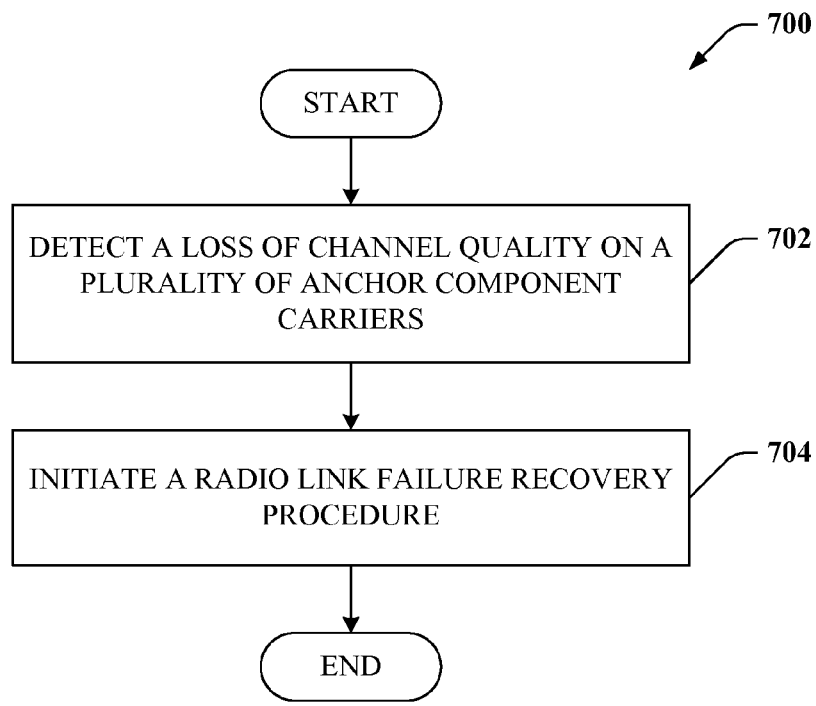
FIG. 7 is an illustration of an example methodology for determining a radio link failure in a multi-carrier configuration.

Turning to FIG. 7, illustrated is a method 700 determining a radio link failure in a multi-carrier configuration. Method 700 can be employed, for example, by a mobile device configured to monitor more than one anchor carrier. At reference numeral 702, a loss of channel quality on a plurality of anchor component carriers can be detected. A loss of channel quality can be detected when a monitored channel quality falls below a predetermined threshold. The predetermined threshold can be a network-configured parameter, an operator-supplied value, and/or a value derived by a mobile device and/or base station, over time, based upon experienced channel conditions. At reference numeral 704, a radio link failure recovery procedure is initiated. In an example, the radio link failure recovery can include a connection re-establishment procedure, a random access attempt, or the like.

Figure 8:
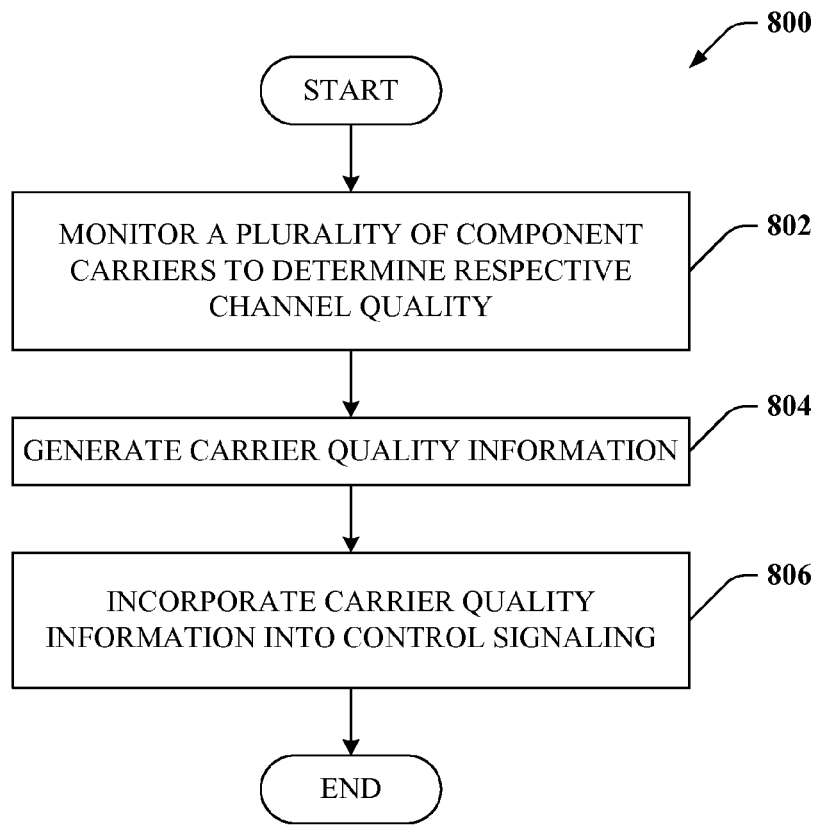
FIG. 8 is an illustration of an example methodology for notifying a base station about a failure of a component carrier in accordance with various aspects.

Referring now to FIG. 8, a method 800 is depicted that facilitates notifying a base station about a failure of a component carrier in accordance with various aspects. Method 800 can be employed, for instance, by a UE configured to utilize a plurality of anchor carriers. Method 800 can commence at reference numeral 802 where a plurality of component carriers are monitored to respectively determine channel quality on each component carrier. In an aspect, the plurality of component carriers includes anchor component carriers which convey control channel information related to the anchor component carriers as well as configured non-anchor carriers. The plurality of component carriers can be monitored to determine an SNR, an interference level, etc. At reference numeral 804, carrier quality information can be generated. Carrier quality information can include quality metrics relative to the plurality of component carriers. In addition, the carrier quality information can identify component carriers having reliable channel conditions as well as component carriers experiencing a loss of channel quality. At reference numeral 806, the carrier quality information is incorporated into control signaling. For example, the carrier quality information can be included in uplink control information, and, in particular, a scheduling request and/or a CQI report.

In one aspect, a list of carrier IDs associated with component carriers with reliable channel conditions, as determined from the carrier quality information, can be included in a scheduling request. In another aspect, the scheduling request can include a bitmap, wherein each bit location is associated with a particular component carrier and indicates whether or not the associate component carrier retains reliable channel quality. In another example, the carrier quality information can be incorporated into a CQI report.

Figure 9:
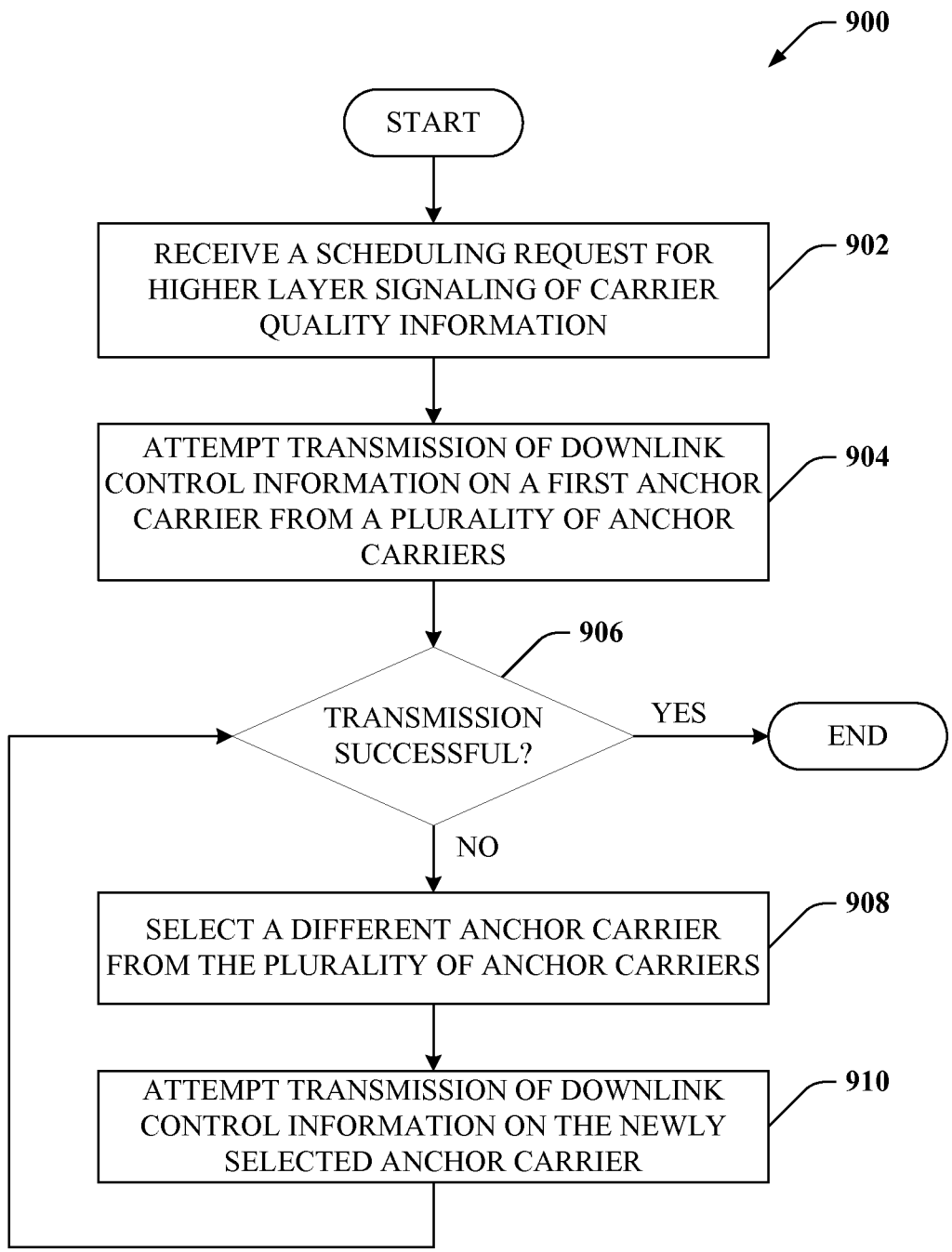
FIG. 9 is an illustration of an example methodology for cycling through component carriers to ensure reception of control information according to various aspects.

FIG. 9 illustrates a method 900 for cycling through component carriers to ensure reception of control information according to various aspects. Method 900 can be employed, for example, by a base station communicating with a UE via a plurality of component carriers. At reference numeral 902, a scheduling request can be received. The scheduling request can include a request for resources to transmit higher layer signaling such as carrier quality information. In another example, the scheduling request can be associated with a user data transmission. At reference numeral 904, a transmission of downlink control information is attempted on a first anchor carrier from a plurality of anchor carriers. The downlink control information can include a scheduling assignment to be utilized for the higher layer signaling and/or user data. At reference numeral 906, a determination is made as to whether the downlink control information transmission is successful. If yes, method 900 terminates. If no, method 900 proceeds to reference numeral 908 where a different anchor carrier is selected from the plurality of anchor carriers. At reference numeral 910, a transmission of downlink control information is attempted on the newly selected anchor carrier. Method 900 loops back to reference numeral 906 to determine if the transmission is successful. Different anchor carriers can be selected and utilized until a successful transmission occurs.

Figure 10:
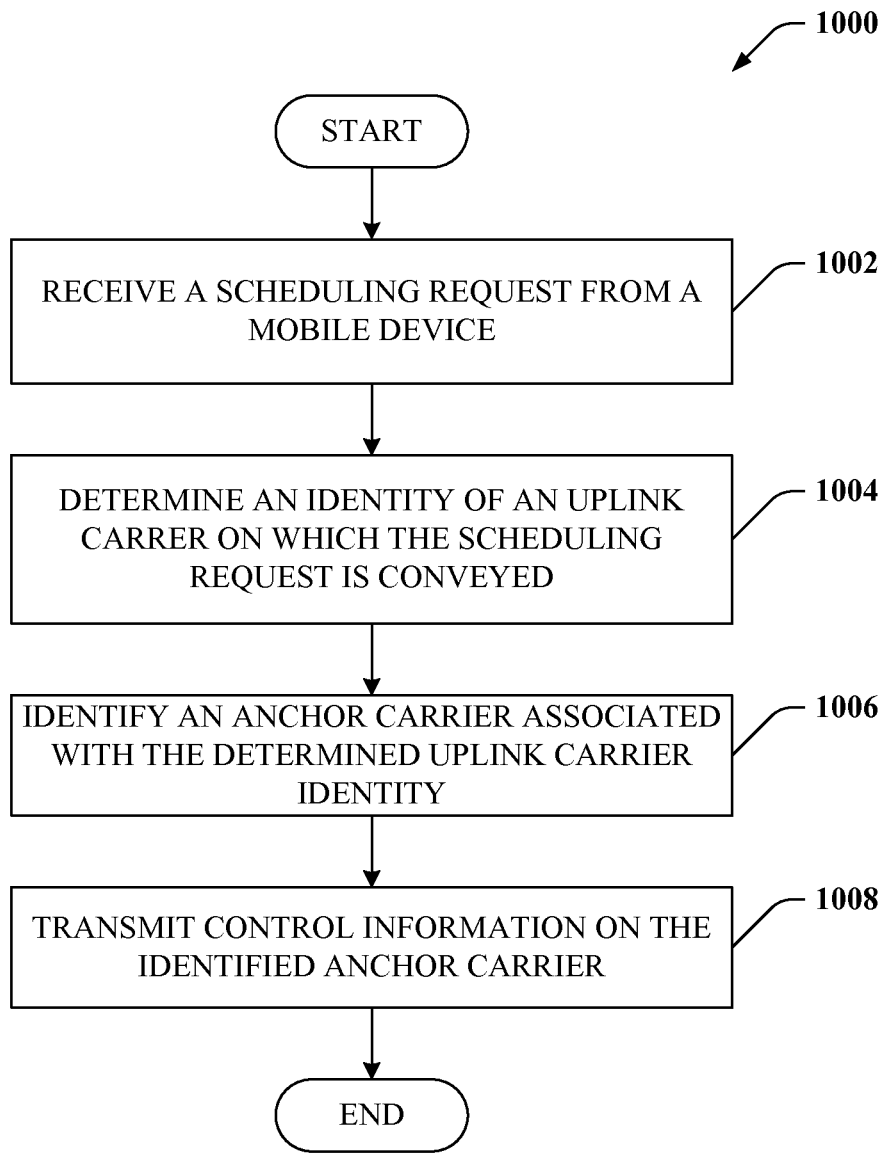
FIG. 10 is an illustration of an example methodology that facilitates selection of an anchor carrier based upon a scheduling request in accordance with various aspects.

Referring now to FIG. 10, a method 1000 is depicted that facilitates selection of an anchor carrier based upon a scheduling request in accordance with various aspects. Method 1000 can be employed, for example, by a base station communicating with a UE via multiple component carriers. At reference numeral 1002, a scheduling request is received from a mobile device. At reference numeral 1004, an identity associated with an uplink carrier is determined, wherein the uplink carrier is a component carrier on which the scheduling request is conveyed. At reference numeral 1006, an anchor carrier is identified that is associated with or linked to the determined uplink carrier identity. At reference numeral 1008, control information is transmitted on the identified anchor carrier.

It will be appreciated that, in accordance with one or more aspects described herein, inferences can be made regarding selecting a component carrier to transmit control information, identifying a loss of channel quality with respect to one or more component carriers, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
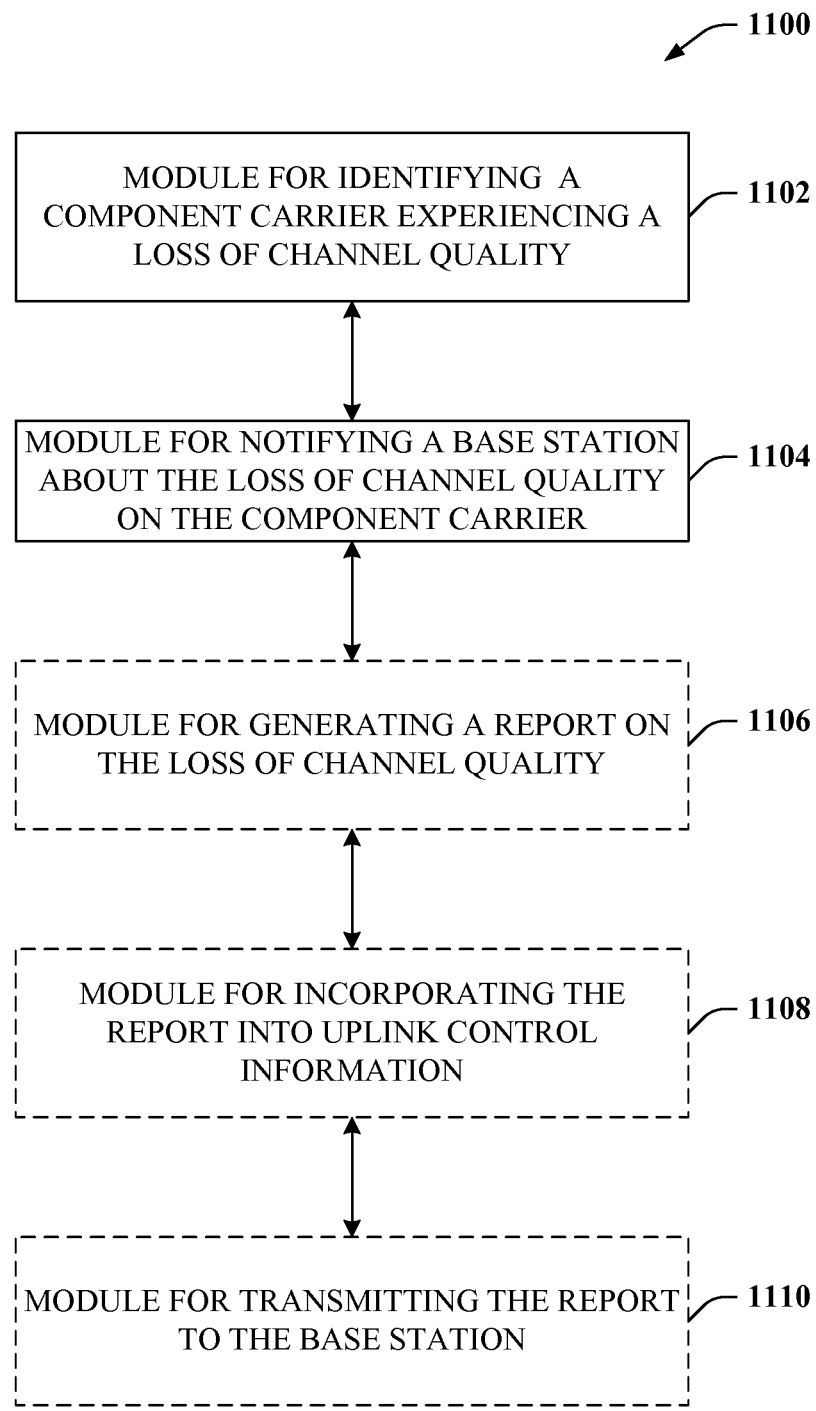
FIG. 11 is an illustration of an example apparatus that facilitates notifying a wireless communication network of a loss of channel quality of one or more component carriers in accordance with various aspects.

Referring next to FIG. 11, an apparatus 1100 that facilitates notifying a wireless communication network of a loss of channel quality of one or more component carriers is illustrated. It is to be appreciated that apparatus 1100 is represented as including functional blocks, which can be functional blocks that represent functions implemented by a processor, software, or combination thereof (e.g., firmware). Apparatus 1100 can be implemented by a user device (e.g., UE 120) and/or any other suitable network entity and can include a module 1102 for identifying a component carrier experiencing a loss of channel quality, a module 1104 for notifying a base station about the loss of channel quality on the component carrier, an optional module 1506 for generating a report on the loss of channel quality, an optional module 1108 for incorporating the report into uplink control information, and an optional module 1110 for transmitting the report to the base station.

Figure 12:
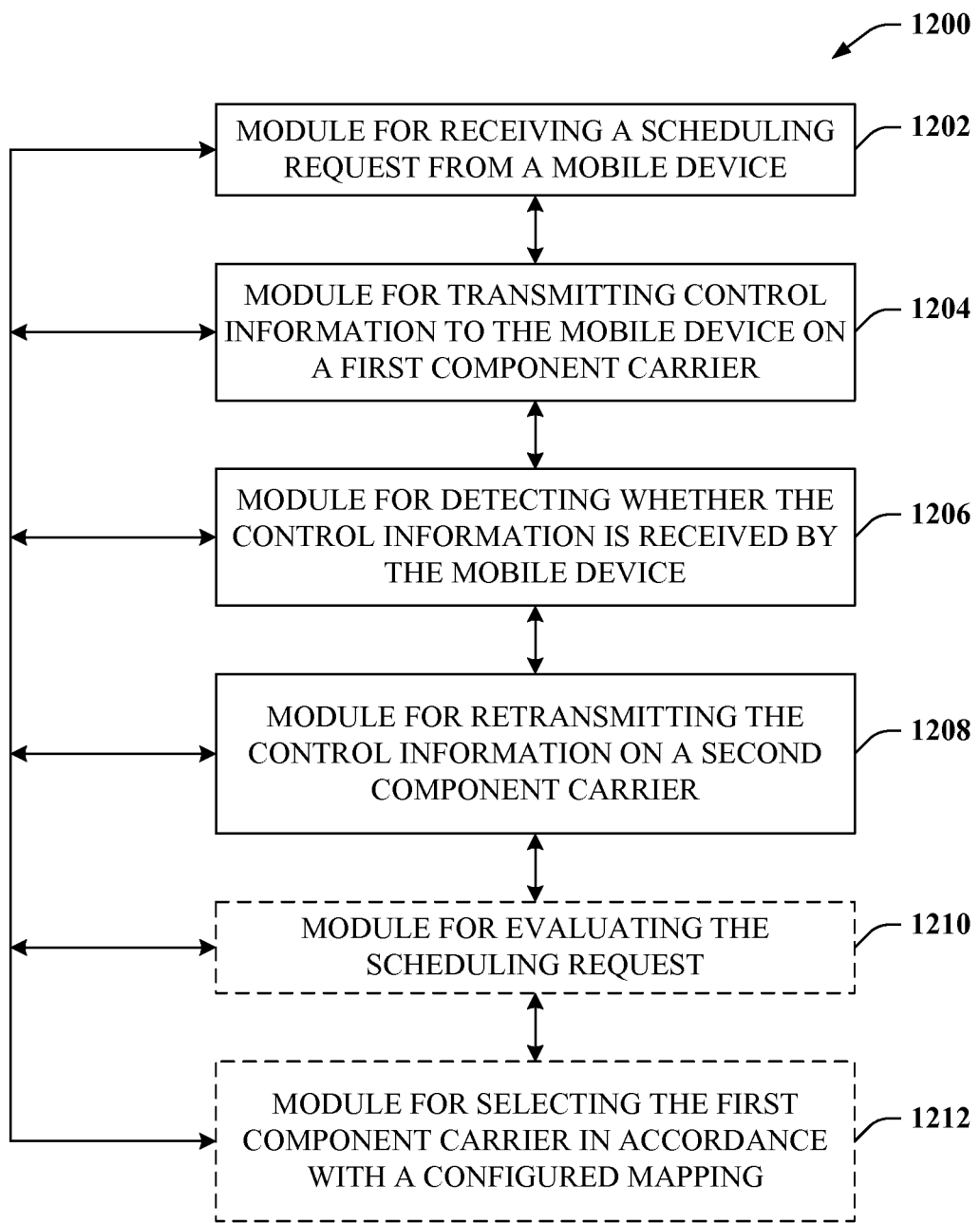
FIG. 12 is an illustration of an example apparatus that facilitates recovery from a loss of channel quality on one or more component carriers in a multi-carrier configuration in accordance with various aspects.

Turning to FIG. 12, an apparatus 1200 that facilitates recovery from a loss of channel quality on one or more component carriers in a multi-carrier configuration is illustrated. It is to be appreciated that apparatus 1200 is represented as including functional blocks, which can be functional blocks that represent functions implemented by a processor, software, or combination thereof (e.g., firmware). Apparatus 1200 can be implemented by a base station (e.g., eNB 110) and/or any other suitable network entity and can include a module 1202 for receiving a scheduling request from a mobile device, a module 1204 for transmitting control information to the mobile device on a first component carrier, a module 1206 for detecting whether the control information is received by the mobile device, and a module 1208 for retransmitting the control information on a second component carrier. In addition, apparatus 1200 can include an optional module 1210 for evaluating the scheduling request, and an optional module 1212 for selecting the first component carrier in accordance with a configured mapping.

Figure 13:
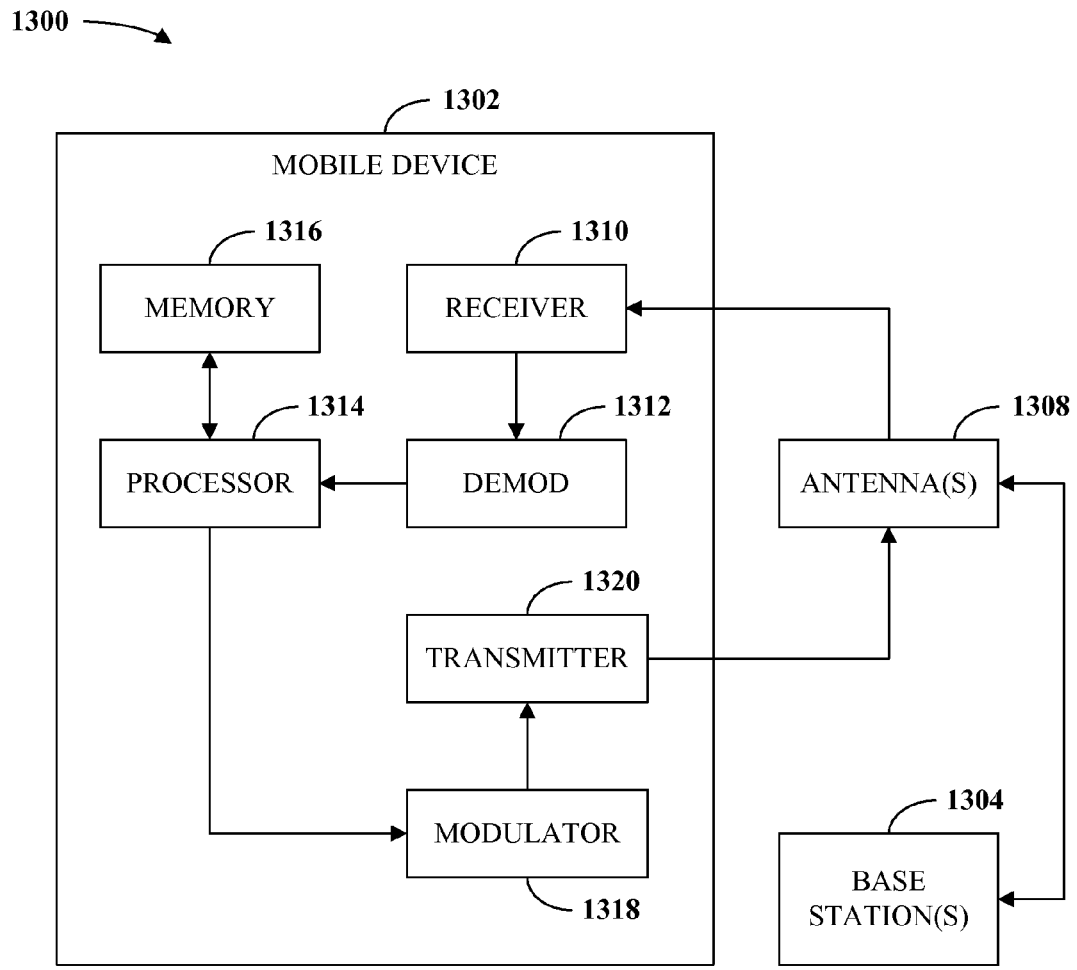
FIGS. 13-14 are block diagrams of respective wireless communication devices that can be utilized to implement various aspects of the functionality described herein.

FIG. 13 is a block diagram of another system 1300 that can be utilized to implement various aspects of the functionality described herein. In one example, system 1300 includes a mobile device 1302. As illustrated, mobile device 1302 can receive signal(s) from one or more base stations 1304 and transmit to the one or more base stations 1304 via one or more antennas 1308. Additionally, mobile device 1302 can comprise a receiver 1310 that receives information from antenna(s) 1308. In one example, receiver 1310 can be operatively associated with a demodulator (Demod) 1312 that demodulates received information. Demodulated symbols can then be analyzed by a processor 1314. Processor 1314 can be coupled to memory 1316, which can store data and/or program codes related to mobile device 1302. Mobile device 1302 can also include a modulator 1318 that can multiplex a signal for transmission by a transmitter 1320 through antenna(s) 1308.

Figure 14:
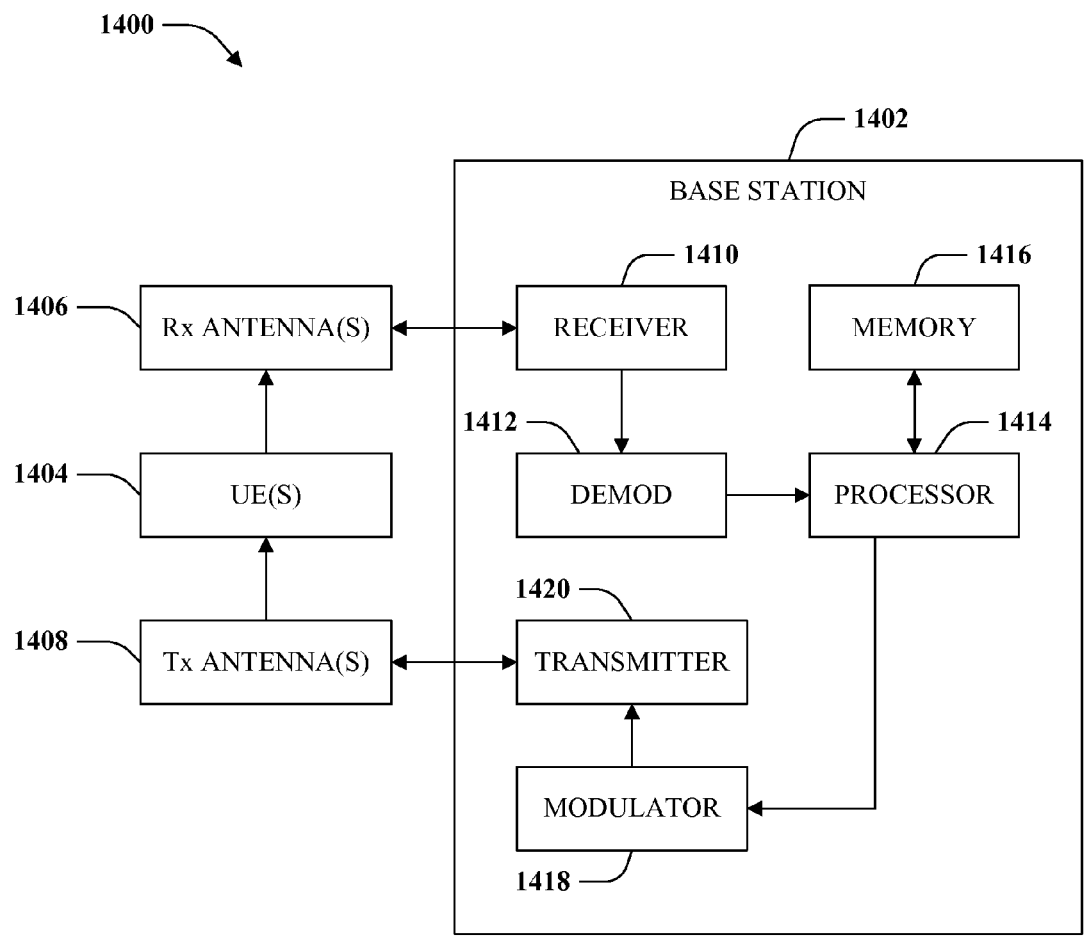

FIG. 14 is a block diagram of a system 1400 that can be utilized to implement various aspects of the functionality described herein. In one example, system 1400 includes a base station or base station 1402. As illustrated, base station 1402 can receive signal(s) from one or more UEs 1404 via one or more receive (Rx) antennas 1406 and transmit to the one or more UEs 1404 via one or more transmit (Tx) antennas 1408. Additionally, base station 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. Base station 1402 can also include a modulator 1418 that can multiplex a signal for transmission by a transmitter 1420 through transmit antenna(s) 1408.

Figure 15:
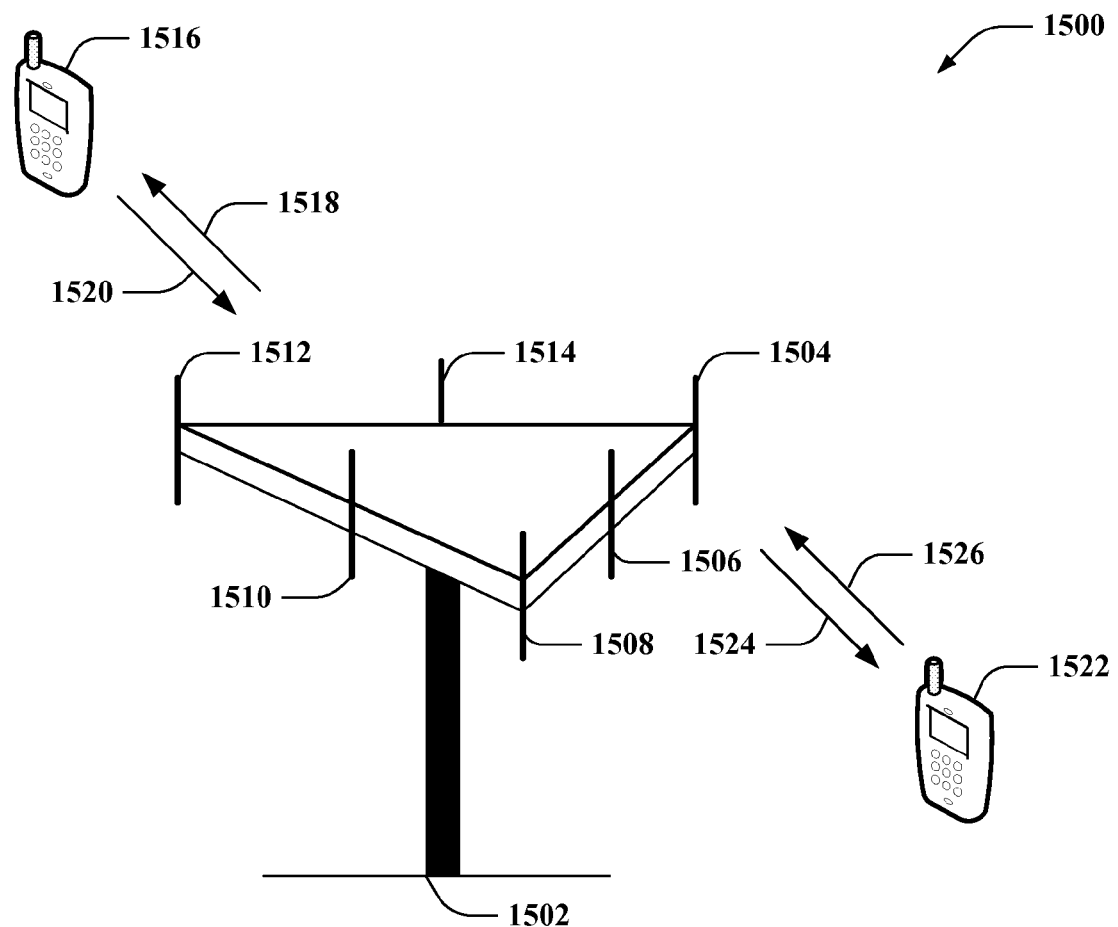
FIG. 15 is an illustration of a wireless communication system in accordance with various aspects set forth herein.

Referring now to FIG. 15, a wireless communication system 1500 is illustrated in accordance with various embodiments presented herein. System 1500 comprises a base station (e.g., access point) 1502 that can include multiple antenna groups. For example, one antenna group can include antennas 1504 and 1506, another group can comprise antennas 1508 and 1510, and an additional group can include antennas 1512 and 1514. Two antennas are illustrated for each antenna group; however, more or fewer antennas can be utilized for each group. Base station 1502 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1502 can communicate with one or more UEs such as UE 1516 and UE 1522; however, it is to be appreciated that base station 1502 can communicate with substantially any number of UEs similar to UEs 1516 and 1522. UEs 1516 and 1522 can be, for example, cellular phones, smart phones, laptops, handheld communication devices, handheld computing devices, satellite radios, global positioning systems, PDAs, and/or any other suitable device for communicating over wireless communication system 1500. As depicted, UE 1516 is in communication with antennas 1512 and 1514, where antennas 1512 and 1514 transmit information to UE 1516 over a downlink 1518 and receive information from UE 1516 over an uplink 1520. Moreover, UE 1522 is in communication with antennas 1504 and 1506, where antennas 1504 and 1506 transmit information to UE 1522 over a downlink 1524 and receive information from UE 1522 over an uplink 1526. In a frequency division duplex (FDD) system, downlink 1518 can utilize a different frequency band than that used by uplink 1520, and downlink 1524 can employ a different frequency band than that employed by uplink 1526, for example. Further, in a time division duplex (TDD) system, downlink 1518 and uplink 1520 can utilize a common frequency band and downlink 1524 and uplink 1526 can utilize a common frequency band.

Each group of antennas and/or the area in which they are designated to communicate can be referred to as a sector of base station 1502. For example, antenna groups can be designed to communicate to UEs in a sector of the areas covered by base station 1502. In communication over downlinks 1518 and 1524, the transmitting antennas of base station 1502 can utilize beamforming to improve signal-to-noise ratio of downlinks 1518 and 1524 for UEs 1516 and 1522. Also, while base station 1502 utilizes beamforming to transmit to UEs 1516 and 1522 scattered randomly through an associated coverage, UEs in neighboring cells can be subject to less interference as compared to a base station transmitting through a single antenna to all its UEs. Moreover, UEs 1516 and 1522 can communicate directly with one another using a peer-to-peer or ad hoc technology (not shown).

According to an example, system 1500 can be a multiple-input multiple-output (MIMO) communication system. Further, system 1500 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1502 can communicate to the UEs 1516 and 1522 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple (NR) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 16:
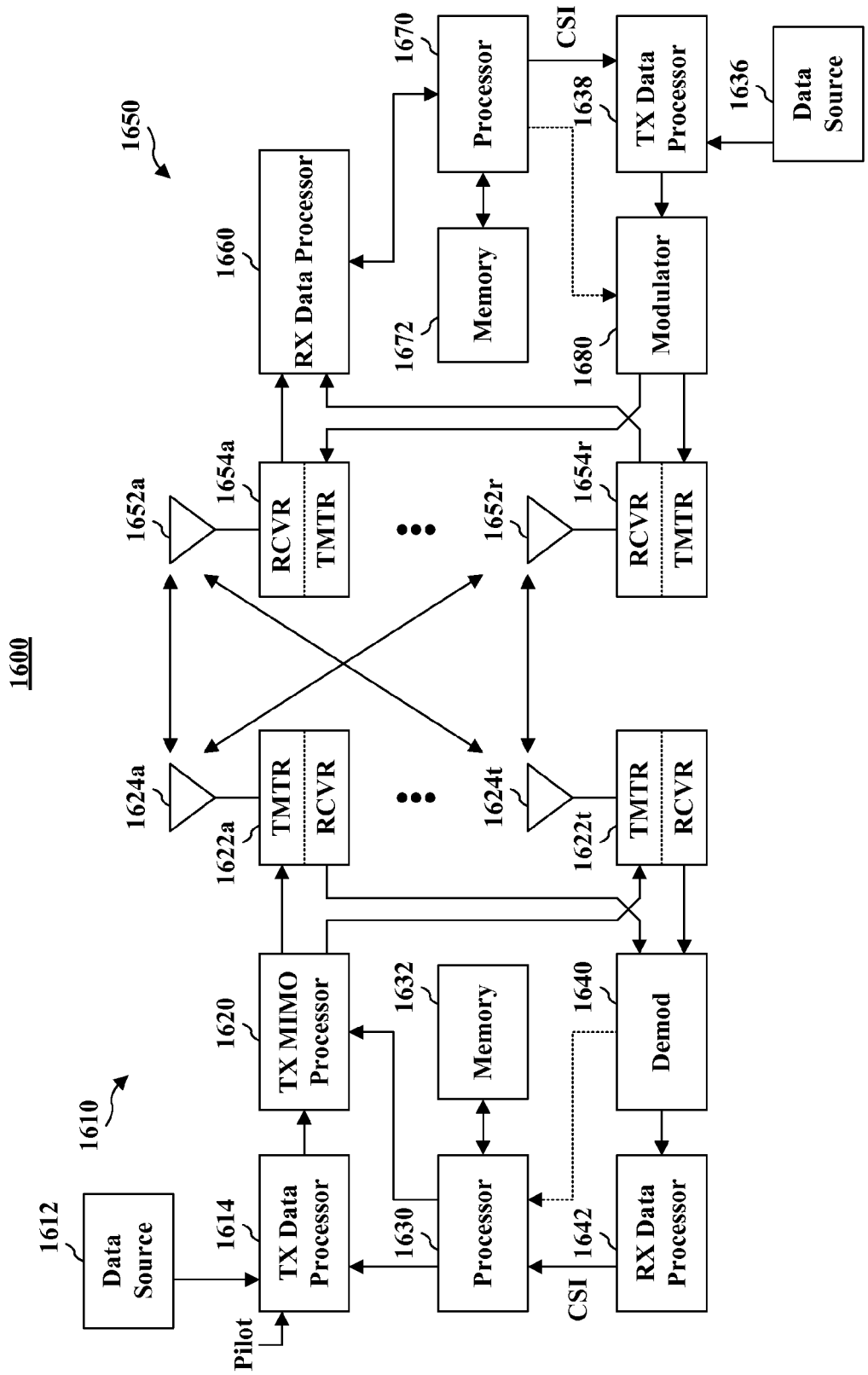
FIG. 16 is a block diagram illustrating an example wireless communication system in which various aspects described herein can function.

FIG. 16 shows an example wireless communication system 1600. The wireless communication system 1600 depicts one base station 1610 and one access terminal 1650 for sake of brevity. However, it is to be appreciated that system 1600 can include more than one base station and/or more than one access terminal, wherein additional base stations and/or access terminals can be substantially similar or different from example base station 1610 and access terminal 1650 described below. In addition, it is to be appreciated that base station 1610 and/or access terminal 1650 can employ the systems (FIGS. 1, 3, 4, 5, 6, and 11-12) and/or method (FIGS. 7-10) described herein to facilitate wireless communication there between.

At base station 1610, traffic data for a number of data streams is provided from a data source 1612 to a transmit (TX) data processor 1614. According to an example, each data stream can be transmitted over a respective antenna. TX data processor 1614 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1650 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1630.

The modulation symbols for the data streams can be provided to a TX MIMO processor 1620, which can further process the modulation symbols (e.g., for OFDM). TX MIMO processor 1620 then provides $N_T$ modulation symbol streams to $N_T$ transmitters (TMTR) 1622a through 1622t. In various embodiments, TX MIMO processor 1620 applies beamforming weights to the symbols of the data streams and to the antenna from which the symbol is being transmitted.

Each transmitter 1622 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1622a through 1622t are transmitted from $N_T$ antennas 1624a through 1624t, respectively.

At access terminal 1650, the transmitted modulated signals are received by $N_R$ antennas 1652a through 1652r and the received signal from each antenna 1652 is provided to a respective receiver (RCVR) 1654a through 1654r. Each receiver 1654 conditions (e.g., filters, amplifies, and downconverts) a respective signal, digitizes the conditioned signal to provide samples, and further processes the samples to provide a corresponding "received" symbol stream.

An RX data processor 1660 can receive and process the $N_R$ received symbol streams from $N_R$ receivers 1654 based on a particular receiver processing technique to provide $N_T$ "detected" symbol streams. RX data processor 1660 can demodulate, deinterleave, and decode each detected symbol stream to recover the traffic data for the data stream. The processing by RX data processor 1660 is complementary to that performed by TX MIMO processor 1620 and TX data processor 1614 at base station 1610.

A processor 1670 can periodically determine which available technology to utilize as discussed above. Further, processor 1670 can formulate a reverse link message comprising a matrix index portion and a rank value portion.

The reverse link message can comprise various types of information regarding the communication link and/or the received data stream. The reverse link message can be processed by a TX data processor 1638, which also receives traffic data for a number of data streams from a data source 1636, modulated by a modulator 1680, conditioned by transmitters 1654a through 1654r, and transmitted back to base station 1610.

At base station 1610, the modulated signals from access terminal 1650 are received by antennas 1624, conditioned by receivers 1622, demodulated by a demodulator 1640, and processed by a RX data processor 1642 to extract the reverse link message transmitted by access terminal 1650. Further, processor 1630 can process the extracted message to determine which precoding matrix to use for determining the beamforming weights.

Processors 1630 and 1670 can direct (e.g., control, coordinate, manage, etc.) operation at base station 1610 and access terminal 1650, respectively. Respective processors 1630 and 1670 can be associated with memory 1632 and 1672 that store program codes and data. Processors 1630 and 1670 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of a wireless communications apparatus, comprising:
    identifying at least one component carrier, from a plurality of component carriers, experiencing a loss of channel quality;
    notifying a base station about the loss of channel quality on the at least one component carrier, wherein the notifying the base station comprises transmitting carrier quality information via Layer 3 signaling; and
    transmitting a scheduling request to the base station, wherein the scheduling request includes an indication to the base station specifying a particular anchor component carrier for the base station to utilize to transmit control information to the wireless communications apparatus when the base station is notified about the loss of channel quality on the at least one component carrier, the particular anchor component carrier being one of the plurality of component carriers,
    wherein the carrier quality information comprises, for at least one additional component carrier different from the at least one component carrier, a channel quality information (CQI) report for each of the at least one additional component carrier, each CQI report comprising information indicating whether a respective one of the at least one additional component carrier experiences the loss of channel quality based on channel quality measurements of the respective one of the at least one additional component carrier over a period of time.

2. The method of claim 1, wherein the at least one component carrier experiencing the loss of channel quality is an anchor carrier.

3. The method of claim 1, wherein the indication includes a flag for the base station to retransmit the control information on a second anchor component carrier which is different from a first anchor component carrier employed by the base station for a first transmission of the control information.

4. The method of claim 1, wherein the indication includes a flag that indicates an implicit mapping between uplink component carriers and anchor component carriers should be employed.

5. The method of claim 1, further comprising transmitting a scheduling request to the base station on an uplink component carrier, wherein an identity of the uplink component carrier indicates, to the base station, a particular anchor component carrier to be utilized from the plurality of component carriers.

6. The method of claim 1, wherein the Layer 3 signaling comprises a list of component carrier identities, wherein each component carrier identity in the list of component carrier identities maintains reliable channel quality.

7. The method of claim 1, wherein the carrier quality information comprises a bitmap including one or more bits, each bit of the bitmap corresponding to a respective component carrier of the plurality of component carriers and indicating whether the corresponding component carrier experiences the loss of channel quality.

8. A wireless communications apparatus, comprising:
    a memory; and
    at least one processor coupled to the memory and configured to:
    identify a component carrier, from a plurality of component carriers, experiencing a loss of channel quality;
    notify a base station about the loss of channel quality on the component carrier by transmitting carrier quality information via Layer 3 signaling; and
    transmit a scheduling request to the base station, wherein the scheduling request includes an indication to the base station specifying a particular anchor component carrier for the base station to utilize to transmit control information to the wireless communications apparatus when the base station is notified about the loss of channel quality on the component carrier, the particular anchor component carrier being one of the plurality of component carriers,
    wherein the carrier quality information comprises, for at least one additional component carrier different from the component carrier, a channel quality information (CQI) report for each of the at least one additional component carrier, each CQI report comprising information indicating whether a respective one of the at least one additional component carrier experiences the loss of channel quality based on channel quality measurements of the respective one of the at least one additional component carrier over a period of time.

9. The wireless communications apparatus of claim 8, wherein the component carrier is an anchor carrier.

10. The wireless communications apparatus of claim 8, wherein the indication includes a flag for the base station to retransmit the control information on a second anchor component carrier which is different from a first anchor component carrier employed by the base station for a first transmission of the control information.

11. The wireless communications apparatus of claim 8, wherein the indication includes a flag that indicates an implicit mapping between uplink component carriers and anchor component carriers should be employed.

12. The wireless communications apparatus of claim 8, wherein the Layer 3 signaling comprises a list of component carrier identities, wherein each component carrier identity in the list of component carrier identities maintains reliable channel quality.

13. The wireless communications apparatus of claim 8, wherein the carrier quality information comprises a bitmap including one or more bits, each bit of the bitmap corresponding to a respective component carrier of the plurality of component carriers and indicating whether the corresponding component carrier experiences the loss of channel quality.

14. A wireless communications apparatus, comprising:
means for identifying a component carrier, from a plurality of component carriers, experiencing a loss of channel quality;
means for notifying a base station about the loss of channel quality on the component carrier by transmitting carrier quality information via Layer 3 signaling; and
means for transmitting a scheduling request to the base station, wherein the scheduling request includes an indication to the base station specifying a particular anchor component carrier for the base station to utilize to transmit control information to the wireless communications apparatus when the base station is notified about the loss of channel quality on the component carrier, the particular anchor component carrier being one of the plurality of component carriers,
wherein the carrier quality information comprises, for at least one additional component carrier different from the component carrier, a channel quality information (CQI) report for each of the at least one additional component carrier, each CQI report comprising information indicating whether a respective one of the at least one additional component carrier experiences the loss of channel quality based on channel quality measurements of the respective one of the at least one additional component carrier over a period of time.

15. The wireless communications apparatus of claim 14, wherein the scheduling request includes a flag that indicates an implicit mapping between uplink component carriers and anchor component carriers should be employed.

16. The wireless communications apparatus of claim 14, wherein the Layer 3 signaling comprises a list of component carrier identities, wherein each component carrier identity in the list of component carrier identities maintains reliable channel quality.

17. The wireless communications apparatus of claim 14, wherein the carrier quality information comprises a bitmap including one or more bits, each bit of the bitmap corresponding to a respective component carrier of the plurality of component carriers and indicating whether the corresponding component carrier experiences the loss of channel quality.

18. A non-transitory computer-readable medium storing computer executable code for wireless communication, comprising code for:
identifying a component carrier, from a plurality of component carriers, experiencing a loss of channel quality;
notifying a base station about the loss of channel quality on the component carrier by transmitting carrier quality information via Layer 3 signaling; and
transmitting a scheduling request to the base station, wherein the scheduling request includes an indication to the base station specifying a particular anchor component carrier for the base station to utilize to transmit control information to a wireless communications apparatus when the base station is notified about the loss of channel quality on the component carrier, the particular anchor component carrier being one of the plurality of component carriers,
wherein the carrier quality information comprises, for at least one additional component carrier different from the component carrier, a channel quality information (CQI) report for each of the at least one additional component carrier, each CQI report comprising information indicating whether a respective one of the at least one additional component carrier experiences the loss of channel quality based on channel quality measurements of the respective one of the at least one additional component carrier over a period of time.

19. The non-transitory computer-readable medium of claim 18, wherein the indication includes a flag for the base station to retransmit the control information on a second anchor component carrier which is different from a first anchor component carrier employed by the base station for a first transmission of the control information.

20. The non-transitory computer-readable medium of claim 18, wherein the indication includes a flag that indicates an implicit mapping between uplink component carriers and anchor component carriers should be employed.

21. The non-transitory computer-readable medium of claim 18, wherein the Layer 3 signaling comprises a list of component carrier identities, wherein each component carrier identity in the list of component carrier identities maintains reliable channel quality.

22. The non-transitory computer-readable medium of claim 18, wherein the carrier quality information comprises a bitmap including one or more bits, each bit of the bitmap corresponding to a respective component carrier of the plurality of component carriers and indicating whether the corresponding component carrier experiences the loss of channel quality.

23. An apparatus, comprising:
a control channel monitor module that evaluates a plurality of component carriers to determine a carrier quality associated with each component carrier;
a quality information module that generates carrier quality information based on the carrier quality associated with each component carrier;
a scheduling request generation module that generates a scheduling request, wherein the scheduling request includes an indication to a base station specifying a particular anchor component carrier for the base station to utilize to transmit control information when the base station is notified about the loss of channel quality on at least one of the plurality of component carriers, the particular anchor component carrier being one of the plurality of component carriers; and
a physical layer module that incorporates the carrier quality information and the scheduling request into a transmission to the base station, wherein the carrier quality information is transmitted to the base station via Layer 3 signaling,
wherein the control channel monitor module is configured to identify a component carrier in the plurality of component carriers experiencing a loss of channel quality, and
wherein the carrier quality information comprises, for at least one additional component carrier different from the component carrier, a channel quality information (CQI) report for each of the at least one additional component carrier, each CQI report comprising information indicating whether a respective one of the at least one additional component carrier experiences the loss of channel quality based on channel quality measurements of the respective one of the at least one additional component carrier over a period of time.

24. The apparatus of claim 23, wherein the control channel monitor module is configured to compare the carrier quality associated with the component carrier with a predetermined threshold.

25. The apparatus of claim 23, wherein the carrier quality information comprises a bitmap including one or more bits, each bit of the bitmap corresponding to a respective component carrier of the plurality of component carriers and indicating the carrier quality associated with the corresponding component carrier.

* * * * *